(12) United States Patent
Shah

(10) Patent No.: US 11,175,952 B2
(45) Date of Patent: Nov. 16, 2021

(54) LEVERAGING THERMAL PROFILES OF PROCESSING TASKS TO DYNAMICALLY SCHEDULE EXECUTION OF THE PROCESSING TASKS

(71) Applicant: International Business Machines Corporation, Armonk, NY (US)

(72) Inventor: Parth Sanjaybhai Shah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/797,403

(22) Filed: Feb. 21, 2020

(65) Prior Publication Data

US 2021/0263773 A1    Aug. 26, 2021

(51) Int. Cl.
  *G06F 9/46*     (2006.01)
  *G06F 9/48*     (2006.01)
  *G06F 11/34*    (2006.01)
  *G06F 9/50*     (2006.01)

(52) U.S. Cl.
  CPC .......... *G06F 9/4893* (2013.01); *G06F 9/5027* (2013.01); *G06F 11/3433* (2013.01)

(58) Field of Classification Search
  CPC ... G06F 9/4893; G06F 9/5027; G06F 11/3433
  See application file for complete search history.

(56) References Cited

U.S. PATENT DOCUMENTS

| 9,183,051 | B2 | 11/2015 | Inoue |
| 9,442,774 | B2 | 9/2016 | Sur |
| 10,416,737 | B2 | 9/2019 | Chandra |
| 2019/0064893 | A1 | 2/2019 | Kumar |

OTHER PUBLICATIONS

Gopinath, "Introduce Thermal Pressure," LKML.org, Apr. 16, 2019, 3 pages. <https://lkml.org/lkml/2019/4/16/1149>.
Hung et al., "Thermal-Aware TaskAllocation and Scheduling for Embedded Systems," IEEE Proceedings of the Design, Automation and Test in Europe Conference and Exhibition (Date'05), Mar. 7-11, 2005, 2 pages. <https://www.researchgate.net/publication/221340160_Thermal-Aware_Task_Allocation_and_Scheduling_for_Embedded_Systems>.
Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — Gregory A Kessler
(74) *Attorney, Agent, or Firm* — Richard B. Thomas

(57) ABSTRACT

Embodiments relate to a system, program product, and method for leveraging thermal profiles of processing tasks to dynamically schedule execution of the processing tasks. Thermal profiles of the processing tasks are generated, where the thermal profiles include core hardware and core processing measurements and predictions of thermal performance based on the measurements. The execution of the processing tasks are scheduled in processing devices to mitigate a potential for reducing a margin to a hardware thermal limit.

20 Claims, 12 Drawing Sheets

LEVERAGING THERMAL PROFILES OF PROCESSING TASKS TO DYNAMICALLY SCHEDULE EXECUTION OF THE PROCESSING TASKS

BACKGROUND

The present disclosure relates to leveraging thermal profiles of processing tasks to dynamically schedule execution of the processing tasks, and, more specifically, for generating thermal profiles of the processing tasks including core hardware and core processing measurements and predictions of thermal performance based thereon, and scheduling the execution of the processing tasks in processing devices to mitigate a potential for reducing a margin to a hardware thermal limit.

Many known central processing units (CPUs) include a plurality of processing devices, i.e., cores to perform multiple processing tasks simultaneously. The present trend in processor manufacturing technology is to increase the computing power of new computing devices through increasing the number of cores on each CPU, and increasing the number of CPUs, while limiting the physical volume for the processing devices, thereby increasing the computing density of the computing devices. Therefore, a margin to a thermal limit of the cores may be decreased and a potential for reaching a thermal limit of the cores is increased. As the thermal margins are decreased and the thermal limits of the core are approached, the lifespan of the hardware may be negatively affected, and one or more known mechanisms for mitigating the approach to the thermal limits are initiated. One such mechanism is to reduce the processing frequency of the cores to reduce the processing speed of the task executions, thereby extending the amount of time required to execute the tasks, such frequency reduction typically referred to as thermal throttling. Some of the known methods for reducing the need for thermal throttling include the use of temperature sensors or power consumption sensors on the cores and scheduling the upcoming processing tasks across the cores to more evenly spread the thermal loading of the cores accordingly.

SUMMARY

A system, computer program product, and method are provided for generating thermal profiles of the processing tasks including core hardware and core processing measurements and thermal predictions based thereon, and scheduling the execution of the processing tasks in processing devices to mitigate a potential for reducing a margin to a hardware thermal limit.

In one aspect, a computer system for leveraging thermal profiles of processing tasks is provided. The system includes one or more multi-core processing devices. Each multi-core processing device includes two or more cores configured to process one or more first instances of one or more processing tasks and one or more second instances of the one or more processing tasks. The system also includes one or more memory devices operably coupled to the one or more multi-core processing devices and one or more hardware thermal counters coupled to each core of the two or more cores. The system further includes one or more core processing performance counters coupled to each core of the two or more cores and a scheduler module residing within the one or more memory devices. The scheduler module is configured to record one or more measurements of the two or more cores contemporaneously with the processing of the one or more first instances of the one or more processing tasks. The one or more measurements include core thermal measurements and core processing performance measurements. The scheduler module is also configured to generate, at least partially subject to the one or more measurements, one or more predictions of one or more thermal effects of processing the one or more second instances of the one or more processing tasks on the two or more cores. The scheduler module is further configured to generate, subject to the one or more measurements and the one or more predictions of the one or more thermal effects, a thermal profile of each process task of the one or more first instances of the one or more processing tasks and the one or more second instances of the one or more processing tasks, thereby generating one or more task thermal profiles. The scheduler module is also configured to distribute, dynamically, subject to the one or more task thermal profiles, processing of the one or more second instances of the one or more processing tasks to the two or more cores.

In another aspect, a computer program product is provided for leveraging thermal profiles of processing tasks is provided. The computer program product includes one or more computer readable storage media and program instructions collectively stored on the one or more computer-readable storage media. The program instructions include program instructions to process one or more first instances of one or more processing tasks and one or more second instances of the one or more processing tasks through two or more cores of one or more multi-core processing devices. The program instructions also include program instructions to record one or more measurements of the two or more cores contemporaneously with the processing of the one or more first instances of the one or more processing tasks. The one or more measurements include core thermal measurements and core processing performance measurements. The program instructions further include program instructions to generate, at least partially subject to the one or more measurements, one or more predictions of one or more thermal effects of processing the one or more second instances of the one or more processing tasks on the two or more cores. The program instructions also include program instructions to generate, subject to the one or more measurements and the one or more predictions of the one or more thermal effects, a thermal profile of the one or more first instances of the one or more processing tasks and the one or more second instances of the one or more processing tasks, thereby generating one or more task thermal profiles. The program instructions further include program instructions to distribute, dynamically, subject to the one or more task thermal profiles, processing of the one or more second instances of the one or more processing tasks to the two or more cores.

In yet another aspect, a computer-implemented method for leveraging thermal profiles of processing tasks is provided. The method includes processing one or more first instances of one or more processing tasks through two or more cores of one or more multi-core processing devices. The method also includes recording one or more measurements of the two or more cores contemporaneously with the processing of the one or more first instances of the one or more processing tasks. The one or more measurements include core thermal measurements and core processing measurements. The method further includes generating, at least partially subject to the one or more measurements, one or more predictions of one or more thermal effects of processing the one or more second instances of the one or more processing tasks on the two or more cores. The method also includes generating, subject to the one or more measurements and the one or more predictions of the one or more thermal effects, a thermal profile of the one or more first instances of the one or more processing tasks, thereby generating one or more task thermal profiles. The method further includes distributing, dynamically, subject to the one or more task thermal profiles, processing of the one or more second instances of the one or more processing tasks to the two or more cores.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
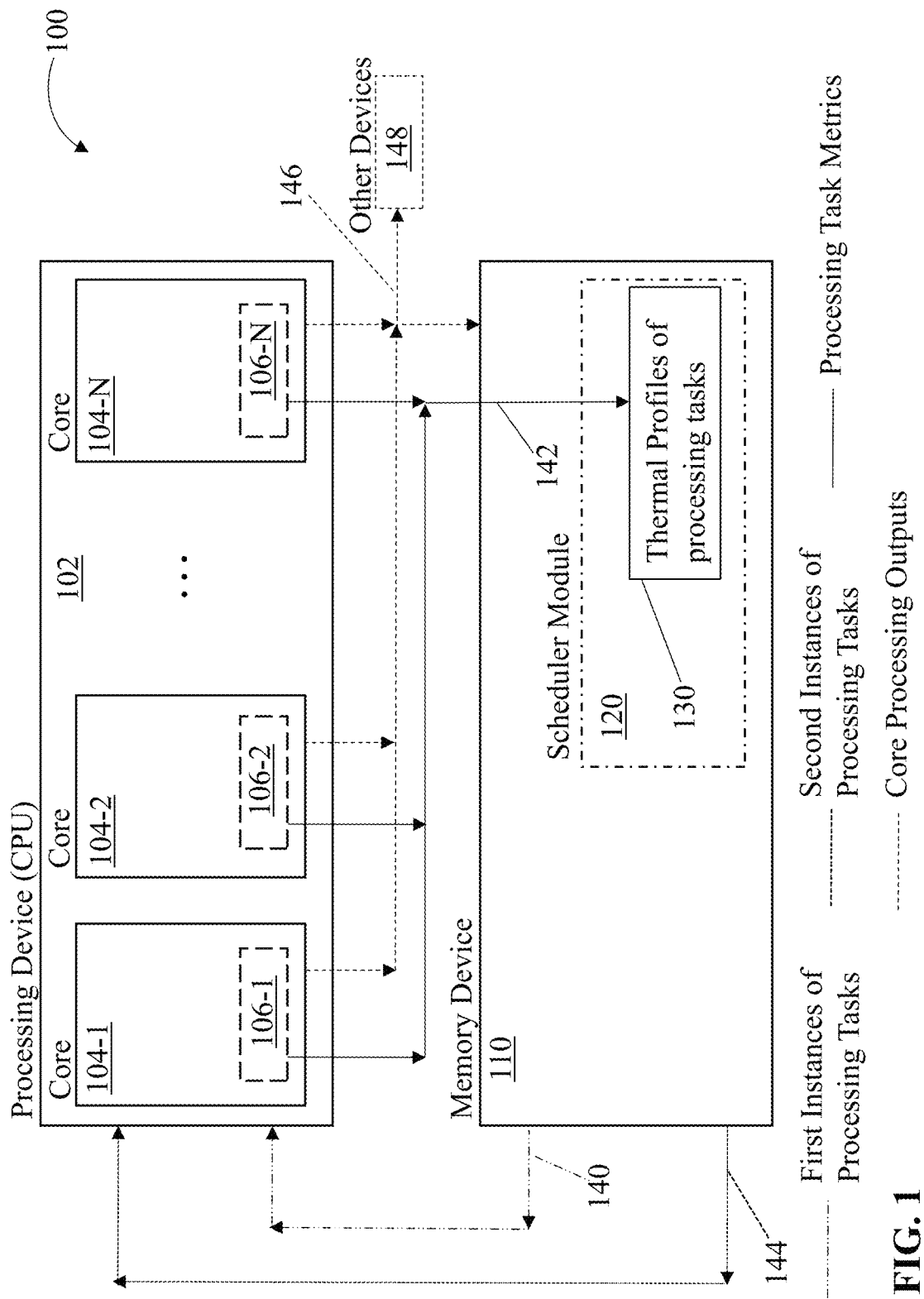
FIG. 1 is a schematic diagram illustrating a computing environment suitable for leveraging thermal profiles of processing tasks to dynamically schedule execution of the processing tasks to mitigate a potential for reducing a margin to a hardware thermal limit, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known central processing units (CPUs) include a plurality of processing devices, i.e., cores to perform multiple processing tasks simultaneously. The present trend in processor manufacturing technology is to increase the computing power of new computing devices through increasing the number of cores on each CPU, and increasing the number of CPUs, while limiting the physical volume for the processing devices, thereby increasing the computing density of the computing devices. Therefore, a margin to a thermal limit of the cores is decreased and a potential for reaching a thermal limit of the cores is increased. In at least some embodiments, at least partially due to the increased computing density, the thermal limit may be relatively quickly attained. As the thermal margins are decreased and the thermal limits of the core are approached, the lifespan of the hardware may be negatively affected, and one or more known mechanisms for mitigating the approach to the thermal limits are initiated. One such mechanism is to reduce the processing frequency of the cores to reduce the processing speed of the task executions, such frequency reduction typically referred to as thermal throttling. Some of the known methods for reducing the need for thermal throttling include the use of temperature sensors or power consumption sensors on the cores and scheduling the upcoming processing tasks across the cores to spread the thermal loading of the cores. Accordingly, relying exclusively on real-time hardware measurements is one method used to address heat generation in multi-core processing devices.

A system, computer program product, and method are disclosed and described herein for leveraging thermal profiles of processing tasks to dynamically schedule execution of the processing tasks, and, more specifically, for generating thermal profiles of the processing tasks including core hardware and core processing measurements and thermal predictions based thereon, and scheduling the execution of the processing tasks in processing devices to mitigate a potential for reducing a margin to a hardware thermal limit. The system includes one or more multi-core processing devices. Each multi-core processing device includes two or more cores. The core(s) is/are configured to process a first instance and a second instance of one or more processing tasks. The system also includes one or more memory devices operably coupled to the multi-core processing devices. The system further includes one or more hardware thermal counters and one or more core processing performance counters coupled to each core and an operation system scheduler module residing within the memory devices. Accordingly, the system, computer program product, and method disclosed herein include core processing performance counters in addition to thermal counters.

The more the core resources are used, the more power is consumed and the more waste heat is generated, and hence the dissipated waste heat results in an increase of the temperature of the associated cores. In at least one embodiment, the hardware thermal counters indicate the temperature of the associated core. The core processing performance counters include counters that measure the number and length of back-end stalls within the associated core as the core processes a task. The core processing performance counters also include counters that measure the instructions completed in one CPU cycle and counters that measure the core utilization.

The measurements are recorded on a task-by-task basis of one or more programs applications being executed on the subject CPU to at least partially determine a thermal profile of each task at least partially based on a predetermined minimum number of first passes of the tasks through the cores. In addition, data continues to be collected for every processing pass thereafter. Moreover, the thermal profiles generated as described herein are further developed based on predictions of the thermal performance of the tasks, where the predictions are based on the existing inventory of collected data for the tasks on a core-by-core basis. The thermal properties within the thermal profiles can then be used to effectively predict the heating effect on the cores during the subsequent task processing events. Accordingly, for known core conditions, thermal profiles of each task are determined and those tasks that tend to heat the core are identified and are distinguished from those tasks that tend not to heat the core.

The thermal profiles of the tasks as generated herein with a combination of empirical data and predictions of thermal performance, real-time margins to reaching a thermal limit, i.e., temperature limitations of the cores, are calculated and those processing tasks that are known to heat the core a known amount can be scheduled by the scheduler module to those cores where heating the core to the thermal limits can be avoided, thereby mitigating a potential for engaging the thermal throttling features. Accordingly, the system, computer program product, and method as disclosed and described herein define a bounded performance impact for applications running in thermally constrained environments by estimating a thermal margin for the current workload mix at runtime.

In at least some embodiments, in addition to classifying the processing tasks with respect to their core heating properties (based on empirical, real-world measurements and calculations), and assigning the processing tasks to the cores based on their established core heating properties, thereby flattening the measured margins to the thermal limits across the cores, a number of additional methods to prevent thermal throttling may be employed. One such additional method includes reducing, within one or more of the cores, by the scheduling manager, a bandwidth of processing tasks known to increase the temperature of the cores to the thermal limits by injecting one or more idle loops into the cores while the associated processing tasks are running through the cores, thereby halting the execution of the processing tasks for a predetermined period of time and allowing the cores to cool down.

Another method includes the scheduler module transferring processing tasks with lower core heating properties from the cooler cores to the hotter cores and transferring processing tasks with higher core heating properties from the hotter cores to the cooler cores. In addition, the scheduler module may reschedule the hotter processing tasks to the cooler cores after a predetermined temporal period. Furthermore, the scheduler module may preempt the warmer processing tasks during processing thereof with the cooler processing tasks within the hotter cores. Yet another additional method includes reducing, by the scheduler module, the CPU processing capacities of all of the cores simultaneously to facilitate the cooling cores, thereby increasing the effects of the aforementioned methods.

Accordingly, a combination of the hardware and software-based metrics to compute the thermal profile of the suite of tasks running on the processor cores facilitates mitigating the performance impact that is necessarily incurred as a result of the thermal throttling features through proactively and dynamically managing, by the scheduler module, the process task scheduling strategy.

Referring to FIG. 1, a schematic diagram is provided illustrating a computing environment, i.e., a computing system 100 suitable for leveraging thermal profiles of processing tasks to dynamically schedule execution of the processing tasks to mitigate a potential for reducing a margin to a hardware thermal limit. The computing system 100 includes one or more multi-core processing devices 102, sometimes referred to as central processing units (CPUs), where, in the exemplary embodiment, one multi-core processing device 102 is shown. Each multi-core processing device 102 includes two or more cores 104, including, in the exemplary embodiment, a first core 104-1, a second core 104-2, and an $N^{th}$ core 104-N, where N can be any integer that enables operation of the multi-core processing devices 102 and the computing system 100. Each of cores 104-1 through 104-N includes a plurality of hardware counters 106, where the first core 104-1 includes a first plurality of hardware counters 106-1, the second core 104-2 includes a second plurality of hardware counters 106-2, and the $N^{th}$ core 104-N includes an $N^{th}$ plurality of hardware counters 106-N. Each of the pluralities of hardware counters 106-1 through 106-N include one or more hardware thermal counters and one or more core processing performance counters (neither shown for clarity). For purposes of clarity, and where appropriate, the plurality of cores 104-1 through 104-N are more generally referred to herein as cores 104-X, where X is a variable representing the integer value of the set of integers 1-N for the respective cores. Similarly, the plurality of hardware counters 106-1 through 106-N are more generally referred to herein as hardware counters 106-X.

In the embodiments described herein, the hardware counters 106-X include programmable performance counters to collect performance data associated with the cores 104-X, where the performance counters are physically coupled directly to the associated core 104-X. In at least one embodiment, the hardware thermal counters of the hardware counters 106-X collect localized temperature data of the associated core 104-X, respectively. In some embodiments, each core 104-X includes one hardware thermal counter. In some alternative embodiments, each core 104-X includes two or more hardware thermal counters to facilitate redundancy and more granular temperature profiles of the cores 104-X.

Also, in at least some embodiments, the core processing performance counters include counters that measure the number of computer processing cycles that are spent within the associated core 104-X as the core 104-X processes a task. The measurements of the back-end stalls indicate the number of CPU cycles for which the task was not providing the instructions for the associated task computations. Reasons for the back-end stalls include, without limitation, waiting for resources (including memory) and extended latencies in the instructions (e.g., square root, reciprocal, and division operations). The back-end-stall measurements take into account the number of resources busy at any time on the associated core 104-X. The tasks which utilize the maximum core resources will have fewer measured back-end-stalls than low utilization tasks. As the processing of the associated task is slowed, the number and duration of the back-end stalls increases, and hence, less heat energy is generated within the core.

The core processing performance counters also include counters that measure the instructions completed in one CPU cycle. The instructions-per-cycles (IPC) measurements indicate varying IPC values of the number of CPU instructions issued per unit of CPU cycles as the task traverses through different phases of its resource use. As the measured IPC value increases, the heat generation in the core 104-X increases. The core processing performance counters further include counters that measure the core utilization that indicates the amount of time the task spends in the execution phase (the required time for the core to process the task) with respect to the amount of time it is blocked for some other resources and/or events. As the utilization value increases due to increasing use of the core resources with respect to the time spent in the execution phase of the instructions, the heat generation in the core 104-X increases. Accordingly, there is a known relationship between the core processing performance measurements and the core temperature measurements and the rate the processing tasks increase the temperature of the core 104-X.

The computing system 100 also includes a memory device 110 that is communicatively and operably coupled to the processing device 102. The memory includes a scheduler module 120 therein. In at least some embodiments, the scheduler module 120 is implemented by the one or more multi-core processing devices 102 that are configured to implement such modules. The scheduler module 120 includes one or more thermal profiles 130 of the processing tasks (discussed further herein) scheduled for execution by the scheduler module 120. First instances 140 of processing tasks are scheduled by the scheduler module 120 for execution within one or more of the cores 104-X within the processing device 102. The hardware counters 106-X of the cores 104-X, respectively, capture the temperature, back-end-stalls, IPC, and utilization values data and the captured data for the first instances 140 of the processing tasks and transmit the outputs of the counters 106-X, i.e., process task metrics 142 to the scheduler module 120 to at least partially generate the thermal profiles 130 of the first instances 140 of the processing tasks. In at least one embodiment, the process task metrics 142 of the first instances 140 of the processing tasks that at least partially generate the thermal profiles 130 of the first instances 140 of the processing tasks are the sole measurement inputs to the thermal profile 130. In other embodiments, every instance of the process task metrics 142 of the first instances 140 of the processing tasks facilitate generating the thermal profiles 130 thereof. A second instance 144 of the processing tasks is scheduled by the scheduler module 120 for execution within one or more of the cores 104-X. The first instances 140 and the second instances 144 of the processing tasks facilitate the generation of one or more core processing outputs 146. The core processing outputs 146 are transmitted to devices, such as, and without limitation, memory device 110, and other devices 148, including, without limitation, display devices, printers, storage devices, and other connected systems. In at least some embodiments, the first instances 140 and the second instances 144 of the process task are distinguished from each other in that the first instances 140 of the processing tasks are one or more previous instances of the process task and the second instances 144 of the processing tasks are the present instance of the processing tasks as scheduled by the scheduler module 120. Accordingly, at least some of the second instances 144 of the processing tasks will be scheduled to the cores 104-X at least partially as a function of the respective thermal profiles 130 for those respective second instances 144 of the process task. The full generation of the thermal profiles 130 is discussed further herein.

Figure 2:
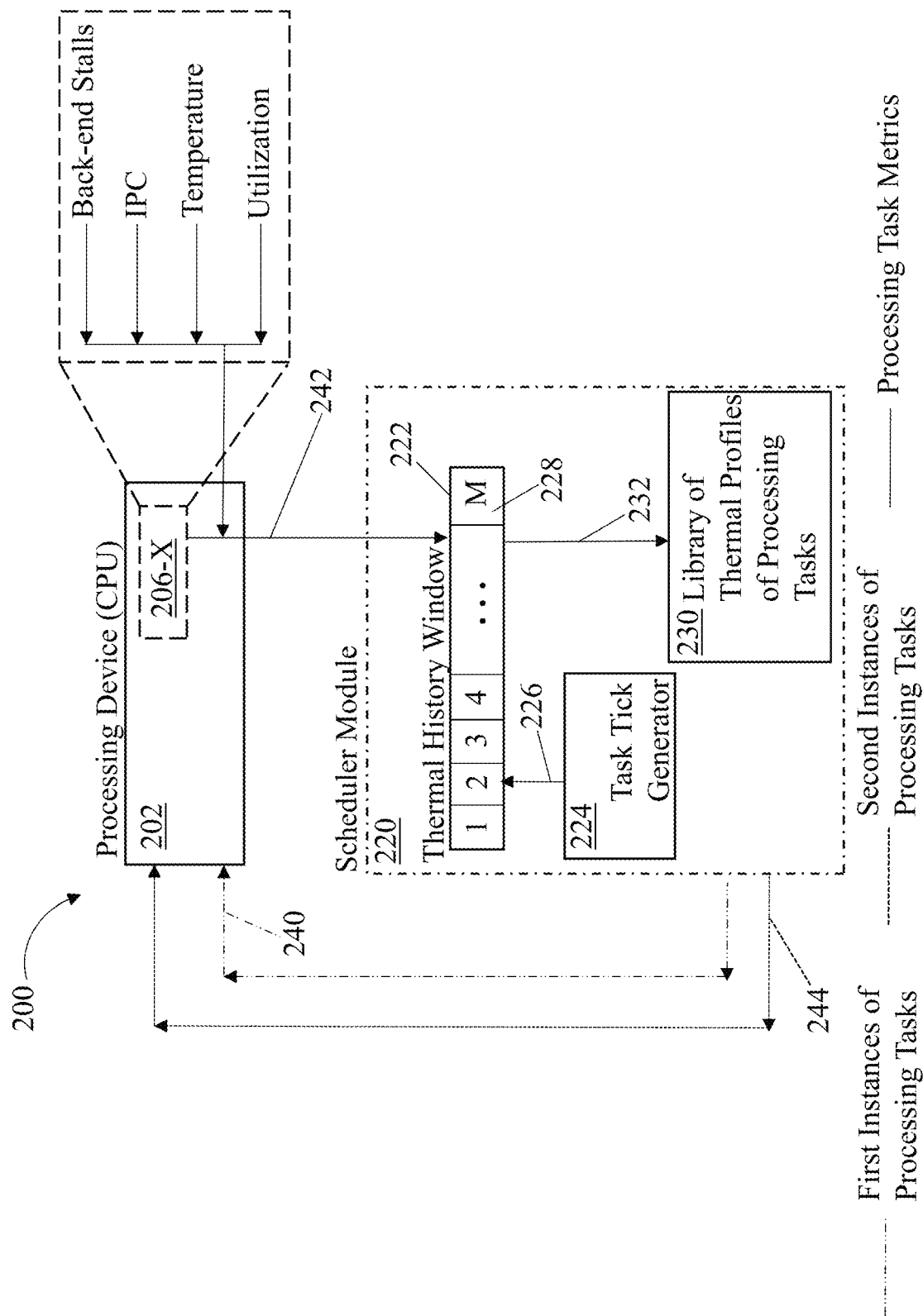
FIG. 2 is a schematic diagram illustrating a portion of the computing environment shown in FIG. 1 with additional details, in accordance with some embodiments of the present disclosure.

FIG. 2 is a schematic diagram illustrating a portion of the computing environment i.e., the computing system 200 with additional details, where the computing system 200 is substantially similar to the computing system 100 as shown and discussed in FIG. 1. The computing system 200 includes the processing device 202 and scheduler module 220 that are substantially similar to the processing device 102 and scheduler module 120, respectively, as shown and described in FIG. 1. The processing device 202 includes the plurality of hardware counters 206-X, where the X represents a variable for the set 1-N to be consistent with counters 106-X in FIG. 1. The plurality of hardware counters 206-X include devices (not shown individually) to measure back-end stalls, IPC, temperature, and utilization as described elsewhere herein, to generate the process task metrics 242. The plurality of thermal profiles 130 forms a library 230 of the thermal profiles 130 of processing tasks 240/244. The scheduler module 220 includes a thermal history window 222 and a task tick generator 224. FIG. 2 also shows a first instance of a process task 240 and a second instance 244 of the process task that are substantially similar to the first instance 140 of a process task and the second instance 144 of the process task, respectively, both shown and described in FIG. 1.

When the scheduler module 220 schedules a first instance 240 of a process task or a second instance 244 of the process task, the scheduler module 220 uses the task tick generator 224 to generate a task tick 226 that initializes a cell 228 within the thermal history window 222, each cell 228 is further identified with numbers 1 through M, where M is any integer that enables operation of the computing system 200 as described herein. The task tick 226 also initiates a reading of the each of the hardware counters 206-X for any back-end stalls, IPC, temperature, and utilization of the associated cores 104-X. The process task metrics 242 include the measurements of back-end stalls, IPC, temperature, and utilization of the associated cores 104-X. Each set of measurements made for each of processing tasks 240/244 as they are processed through the respective cores 104-X are stored in one of the cells 228 of the thermal history window 222, where each task 240/244 for each core 104-X has an assigned thermal history window 222. Therefore, the scheduler module 220 includes a plurality of thermal history windows 222 therein, where in at least one embodiment, the number of thermal history windows 222 is equivalent to the number of first instances 240 of processing tasks times the N number of cores 206-X. In at least one embodiment, once there are more than four sets of process task metrics 242 occupying cells 228 numbering from 1 through at least 5, a thermal profile 232 of the associated process task 240/244 is generated by the scheduler module 220, where the thermal profile 232 is substantially similar to the thermal profile 130 (shown in FIG. 1). The thermal profile 232 is transmitted to the library 230 of thermal profiles of processing tasks.

Figure 3:
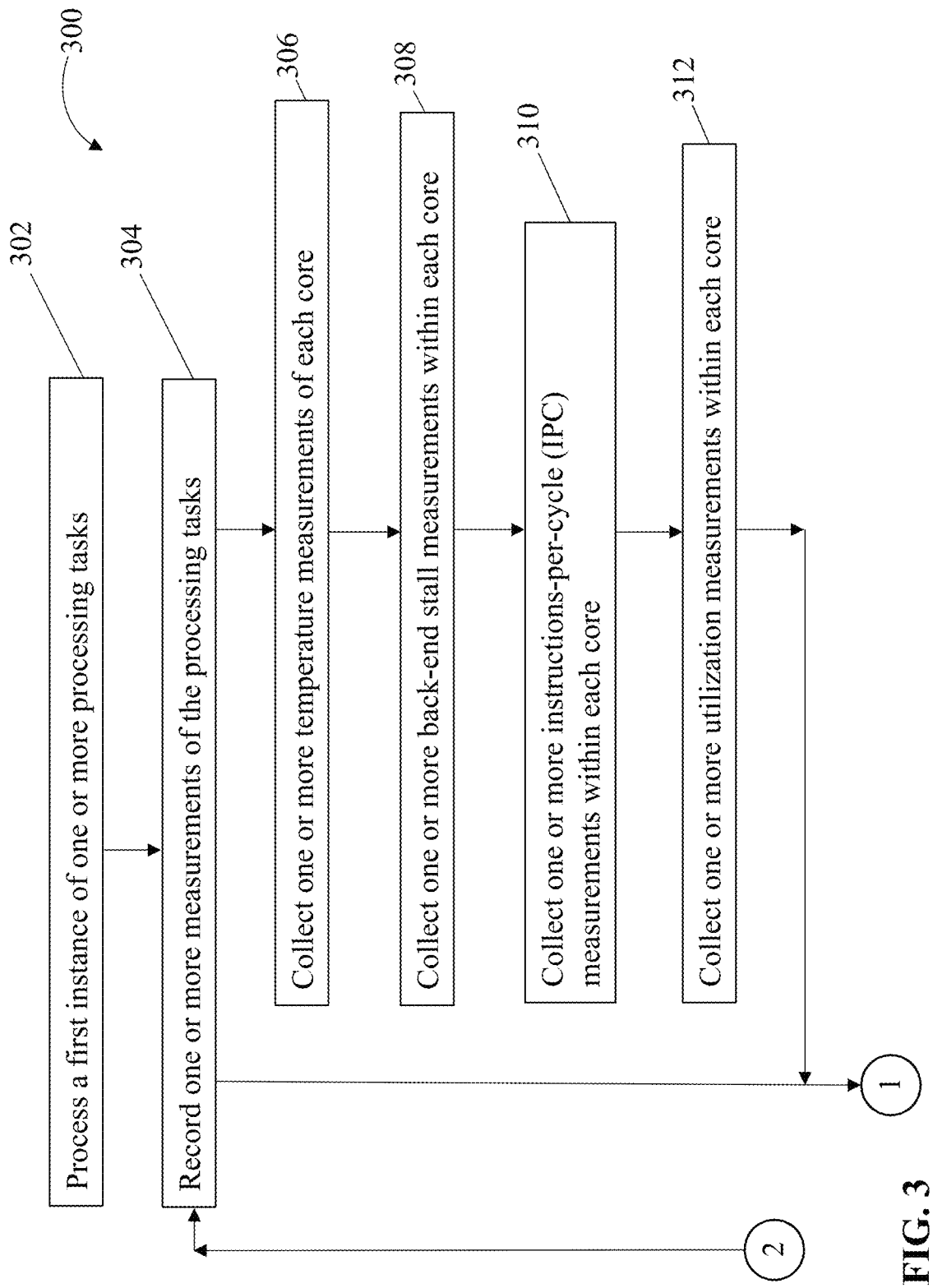
FIG. 3 is a flow chart illustrating a process for generating thermal profiles of processing tasks, in accordance with some embodiments of the present disclosure.
Figure 3:
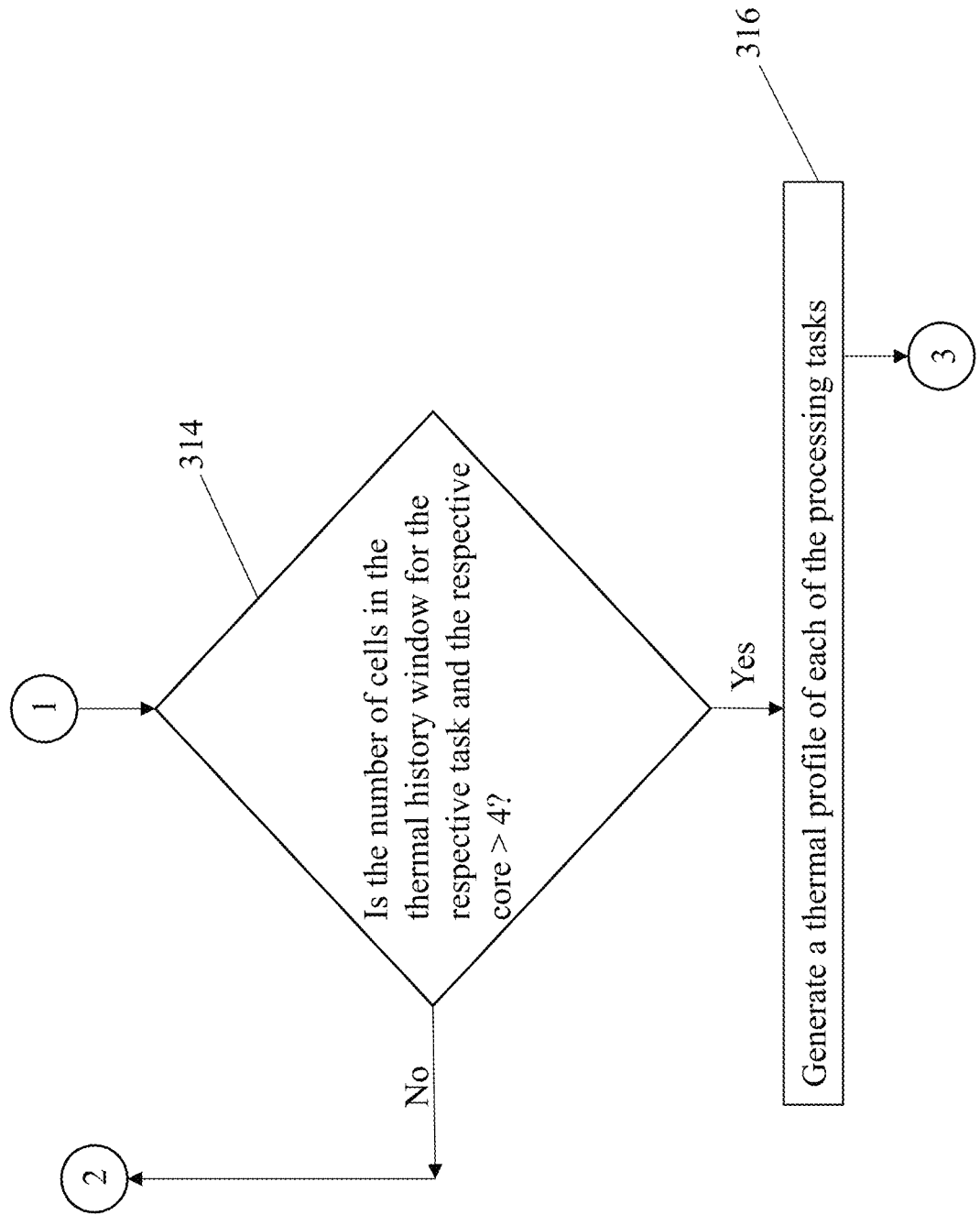
Figure 3:
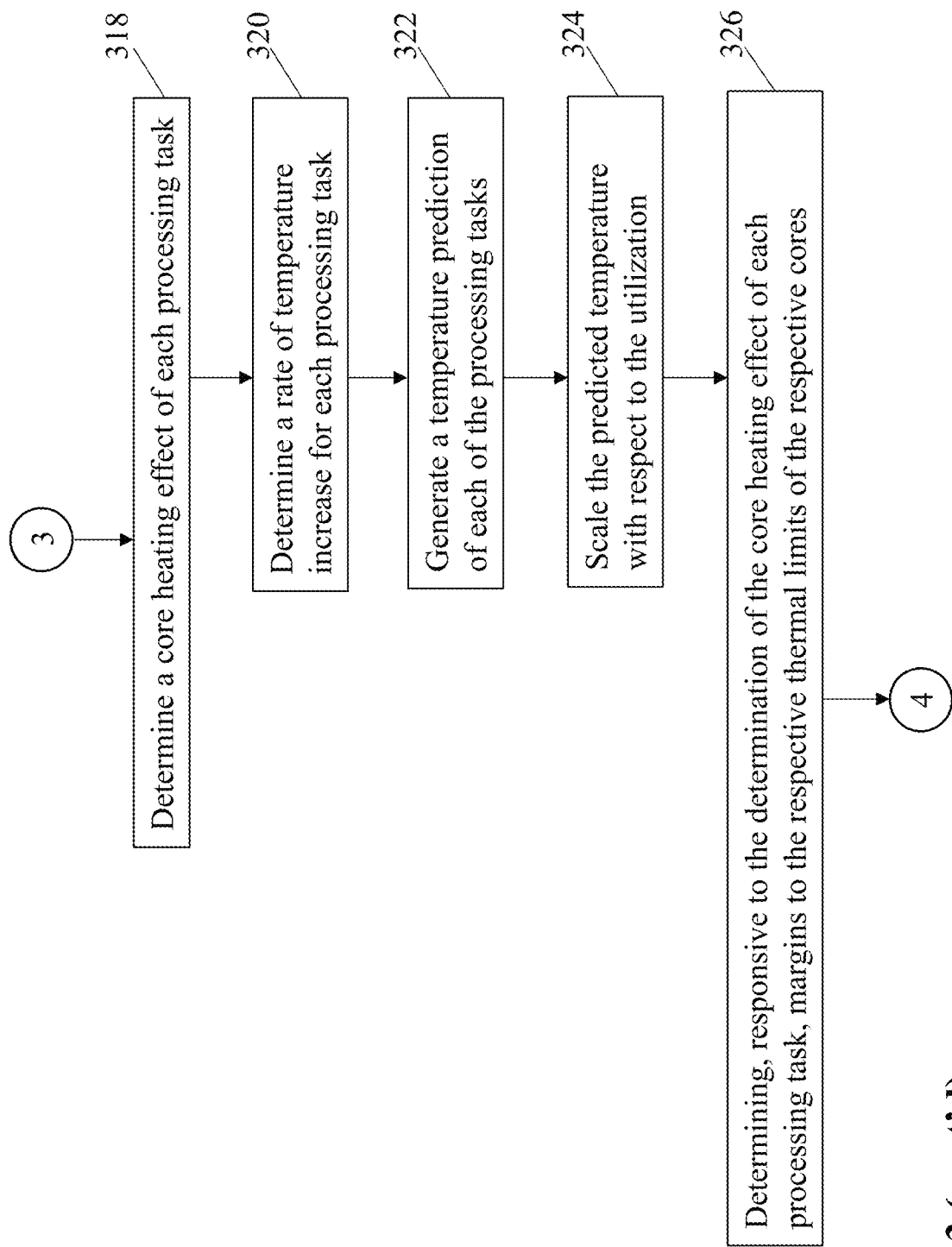
Figure 3:
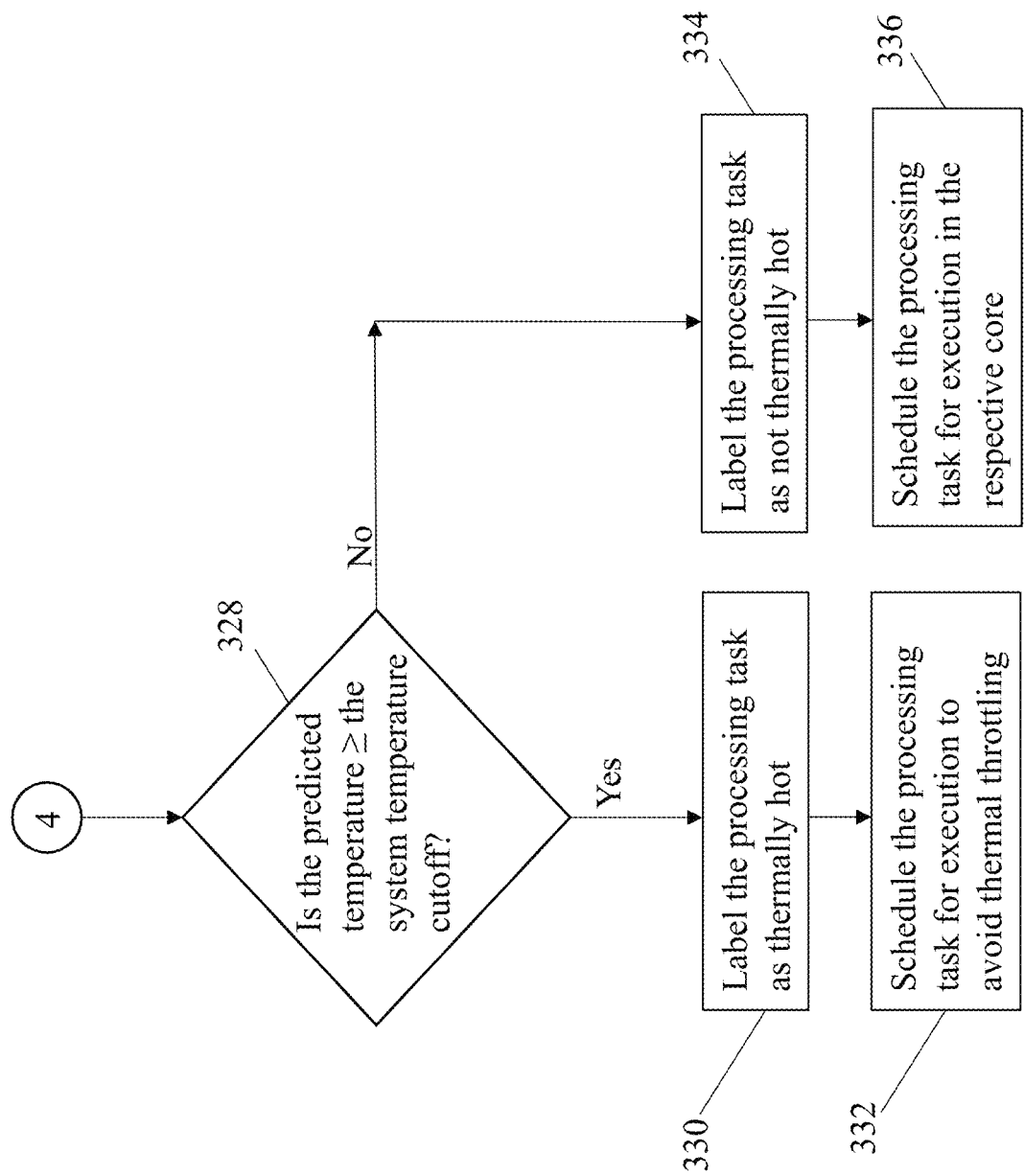

Referring to FIG. 3, and also referring to FIGS. 1 and 2, a flow chart is provided illustrating a process 300 for generating thermal profiles 130 of processing tasks 240 and 244 to create the library 230 of thermal profiles 130. The process 300 includes processing 302, within the computing system 200, the first instances 240 of one or more processing tasks through one or more of the cores 104-X of the one or more multi-core processing devices 202. In at least some embodiments, the first instance 240 of the process task is one or more previous instances of the process task. When the scheduler module 220 schedules a first instance 240 of a process task or a second instance 244 of the process task, the scheduler module 220 uses the task tick generator 224 to generate a task tick 226 that initializes a cell 228 within the thermal history window 222. The task tick 226 also initiates a reading of the each of the hardware counters 206-X for any back-end stalls, IPC, temperature, and utilization of the associated cores 104-X. The process task metrics 242 include the measurements of back-end stalls, IPC, temperature, and utilization of the associated cores 104-X. Each set of measurements made for each of the processing tasks 240/244 are stored in one of the cells 228 of the thermal history window, where each task 240/244 has an assigned thermal history window 222. Therefore, the scheduler module 220 includes a plurality of thermal history windows 222 therein. In at least one embodiment, once there are more than four sets of process task metrics 242 occupying cells 228 numbering from 1 through 5, a thermal profile 232 of the associated process task 240/244 is generated by the scheduler module 220 and transmitted to the library 230 of thermal profiles 130 of processing tasks.

The process 300 also includes recording 304, by the respective hardware counters 206-X, one or more measurements, i.e., generating the process task metrics 242 of one or more of the cores 104-X of the one or more multi-core processing devices 202 contemporaneously with the processing of the first instance 240 of the one or more processing tasks, and transmitting the process task metrics 242 to the scheduler module 220.

The recording operation 304 of one or more measurements includes collecting 306 one or more temperature measurements from the hardware thermal counters of the pluralities of the programmable hardware performance counters 206-X of each respective core 104-X. In at least one embodiment, the temperature data from the respective hardware thermal counters of the pluralities of hardware counters 206-X collect localized temperature data of the associated core 104-X, respectively. In some embodiments, one temperature measurement for each core 104-X is transmitted within the respective process task metrics 242. In some alternative embodiments, more than one temperature measurement for one or more cores 104-X are transmitted within the respective process task metrics 242. In at least some embodiments, if there are more than four cells 228 (the numeral 4 is non-limiting) within the thermal history window 222 for the associated processing tasks 240 for a particular core 104-X containing temperature data, the scheduler module 220 calculates an overall moving average of the near-term temperature for that core 104-X as the first instances 240 and second instances 244 of the processing tasks are being processed by that core 104-X. In at least some embodiments, if the calculated average temperatures for the core 104-X indicate an increasing trend with respect to time, the scheduler module 220 generates a signal to indicate the respective core 104-X is heating up. Accordingly, data associated with every core 104-X for every first instance 240 and second instance 244 of the processing tasks is collected and used to determine the thermal disposition of the cores 104-X.

In addition, the recording operation 304 of one or more measurements includes collecting 308 one or more back-end stall measurements from the back-end stall core processing performance counters of the pluralities of the programmable hardware performance counters 106-X of each respective core 104-X. The indications of the recorded measurements of the back-end stalls are described herein. In at least some embodiments, one or more back-end stall measurements for one or more cores 104-X are transmitted within the respective process task metrics 142. In at least some embodiments, if there are more than four cells 228 (the numeral 4 is non-limiting) within the thermal history window 222 for the associated processing tasks 240 for a particular core 104-X containing back-end stall data, the scheduler module 220 calculates an overall moving average of the near-term back-end stalls for that core 104-X as the first instances 240 and second instances 244 of the processing tasks are being processed by that core 104-X. In at least some embodiments, if the calculated average back-end stalls for the core 104-X is less than 5% of the total number of processing cycles, the scheduler module 220 generates a signal to indicate the respective core 104-X is saturated, i.e., there are few stalls and the associated cores 104-X are being efficiently used with respect to the use of the associated process cycles. Accordingly, data associated with every core 104-X for every first instance 240 and second instance 244 of the processing tasks is collected and used to determine the back-end stall disposition of the cores 104-X.

Moreover, the recording operation 304 of one or more measurements includes collecting 310 one or more instructions-per-cycle measurements from the IPC processing performance counters of the pluralities of the programmable hardware performance counters 206-X of each respective core 104-X. The indications of the recorded measurements of the IPCs are described herein. In at least some embodiments, one or more IPC measurements for one or more cores 104-X are transmitted within the respective process task metrics 142. In at least some embodiments, if there are more than four cells 228 (the numeral 4 in non-limiting) within the thermal history window 222 for the associated processing tasks 240 for a particular core 104-X containing IPC data, the scheduler module 220 calculates a standard deviation of the near-term IPC for that core 104-X as the first instances 240 and second instances 244 of the processing tasks are being processed by that core 104-X. In at least some embodiments, if the calculated standard deviation for IPC for the core 104-X is greater than 5%, the scheduler module 220 generates a signal to indicate the respective core 104-X is processing instructions that are undergoing one or more phase changes. Accordingly, data associated with every core 104-X for every first instance 240 and second instance 244 of the processing tasks is collected and used to determine the IPC disposition of the cores 104-X.

Furthermore, the recording operation 304 of one or more measurements includes collecting 312 one or more utilization measurements from the utilization processing performance counters of the pluralities of the programmable hardware performance counters 206-X of each respective core 104-X. The indications of the recorded measurements of the core utilizations are described herein. In at least some embodiments, one or more core utilization measurements for one or more cores 104-X are transmitted within the respective process task metrics 142. The use of the utilization data is discussed further herein. Accordingly, data associated with every core 104-X for every first instance 240 and second instance 244 of the processing tasks is collected and used to determine the utilization disposition of the cores 104-X.

A determination 314 is made, by the scheduler module 220, with respect to if the number of cells 228 in the thermal history window for the respective process task and the respective core is greater than 4, where the numeral 4 is non-limiting. The determination operation 314 facilitates having sufficient information and data for the four core measurements to perform the calculations described herein. A negative response to the determination operation 314 results in the process 300 returning to the measurements recording operation 304.

A positive response to the determination operation 314 results in the process 300 proceeding to generating 316, by the scheduler module 220, the plurality of thermal profiles 130 of each of the respective first instances 240 of the processing tasks. Each task thermal profile 130 of the plurality of task thermal profiles 130 includes the aforementioned core thermal measurements and core processing performance measurements within the process task metrics 242. Accordingly, if there are more than four cells 228 (the numeral 4 being non-limiting) within the thermal history window 222 for the associated processing tasks 240 for a particular core 104-X containing temperature, IPC, back-end stall, and utilization data, the scheduler module 220 is permitted to determine a thermal profile 130 for the associated process task 240 and core 104-X.

In general, the hardware thermal counters of the pluralities of the programmable hardware performance counters 206-X of each respective core 104-X, and the thermal profiles 130 generated from the collected data, are used such that the scheduler module 220 can predict the temperature induced by the associated execution of the second instances 244 of the processing tasks under certain circumstances, including, without limitation, the present circumstances. The thermal properties empirically collected or calculated, of the first instances 240 of the processing tasks are used to calculate, i.e., predict the respective counter values of the second instances 244 of the processing tasks when executing such second instances 244 of the processing tasks in the respective cores 104-X of the processing device 202. This is followed by generating the thermal profiles 130 of the processing tasks 244 which facilitate the determination of whether the processing tasks 244 have the determined thermal properties to potentially heat up the core 104-X to reach the thermal limits.

As a portion of the generating 316 a thermal profile operation, a core heating effect of each process task is determined 318 by the scheduler module 220. The determining a core heating effect operation 318 includes determining 320, by the scheduler module 220, a rate of temperature increase for each first instances 240 of processing tasks. In at least some embodiments, an extrapolation technique, such as an averaging operation, is performed to provide a marginally more conservative value. Specifically, in at least one embodiment, the rate of temperature increase is calculated through the scheduler module 220 calculating a temperature difference between each tick, and then determining an average value of the rate of temperature change. A predetermined number of one or more of the temperature difference values are summed and the summed value is divided by the associated temporal period of the respective data collection. The collection of the rate of temperature differences is averaged to determine an average rate of temperature change associated with the respective process task. In at least one embodiment, the value of the average rate of temperature change is positive, i.e., exhibiting a positive trend due to the associated process task typically heating the respective core 104-X during execution thereof. However, in some circumstances, the value of the average rate of temperature change is negative, i.e., exhibiting a negative trend due to the associated process task typically cooling the respective core 104-X during executing thereof. In at least one embodiment, those processing tasks that exhibit a neutral, or null, effect are grouped with the processing tasks that tend to cool the respective core 104-X. Grouping of the processing tasks is discussed further below.

The determining a core heating effect operation 318 also includes generating 322, by the scheduler module 220, a thermal prediction, i.e., a temperature prediction of each of the respective second instances 244 of the processing tasks expected on the next tick as generated by the task tick generator 224. The temperature prediction includes a predicted temperature of the respective core 104-X for the next scheduled execution of the respective second instance 244 of the process task. In at least some embodiments, the most recent temperature measurement of the respective core 104-X as resident within one of the cells 228 of the thermal history window 222 and the respective extrapolated average temperature change as determined in the determine a rate of temperature increase operation 320.

In at least some embodiments, the predicted temperature value generated through the temperature prediction generation operation 322 is scaled 324, by the scheduler module 220, with respect to a value generated through the recorded utilization values. Specifically, an average utilization value is calculated using utilization values resident within a predetermined number of cells 228 of the thermal history window 222. The generated average utilization value is divided by 100 to create a utilization adjusting factor to conservatively adjust the predicted temperature with the effects of the amount of time the process task spends in the execution phase. The predicted temperature is multiplied by the utilization adjusting factor to generate a utilization-adjusted predicted temperature value.

In at least one embodiment, the thermal profiles 130 include information with respect to the operating environments of the cores 104-X at the time of processing the first instance 240 of the processing tasks, including, without limitation, processing tasks immediately preceding, and concurrent processing tasks with, the present process task being analyzed.

Accordingly, in addition to using the collected thermal data from the respective plurality of programmable hardware performance counters 206-X as discussed herein as the first instances 240 of the processing tasks are executed through the respective cores 104-X, predictions of the thermal effects of the second instances 244 of the processing tasks are generated and used to fully establish the thermal profiles 130 of the processing tasks.

Once the fully established thermal profile 130 of the respective process task is generated and stored in the library 230 of thermal profiles 130, the scheduler module 220 determines 326, responsive to the determination 318 of the core heating effect of each process task, margins to the respective thermal limits of the respective cores 104-X. Specifically, the respective predicted temperature value is compared to an established thermal limit of the respective core 104-X. In some embodiments, the established thermal limit of the respective core 104-X may be the core manufacture's stated limit with a conservative reduction to a predetermined system temperature cutoff, thereby facilitating a mitigation of a potential for thermal overshoots. In some embodiments, the established thermal limits are applied globally to every core 104-X in the processing device 102. Therefore, once the margins to the predetermined system temperature cutoff are determined for both the present condition of the respective core 104-X and the predicted thermal condition of the core 104-X if the respective process task is to be scheduled for execution within the core 104-X.

The scheduler module 220 distinguishes, responsive to the core heating effects determination operations 318 through 324, and the thermal limits margins determination operations 326, the processing tasks and their associated task thermal profiles. Specifically, these processing tasks and associated thermal profiles are sorted into a first group of processing tasks and a second group of processing tasks. The first group of processing tasks includes a first subset of the first instances 140 of the one or more processing tasks and their associated task thermal profiles 130 that transfer a first amount of heat energy to the one or more cores 104-X. The second group of processing tasks includes a second subset of the first instances 140 of the one or more processing tasks and their associated task thermal profiles 130 that transfer a second amount of heat energy to the one or more cores 104-X, where the first amount of heat energy is greater than the second amount of heat energy.

Once the value for the predicted temperature is calculated, the predicted temperature is compared 328, by the scheduler module 220, with the predetermined system temperature cutoff. If the predicted temperature is greater than or equal to the predetermined system temperature cutoff, the respective process task is labeled 330, by the scheduler module 220, as thermally hot and the task is scheduled 332, by the scheduler module 220, in a manner to reduce a potential for thermal throttling of the process task in the respective core 104-X. If the predicted temperature is less than the predetermined system temperature cutoff, the respective process task is labeled 334, by the scheduler module 220, as not thermally hot, i.e., thermally cold, and the task is scheduled 336, by the scheduler module 220, for the respective core 104-X. Accordingly, the first group of processing tasks are considered to be the hotter tasks and the second group of processing tasks are considered to be the colder tasks. In at least one embodiment, the terms "thermally hotter" and "thermally colder" are used with respect to a median amount of heat energy transferred by the processing tasks. For example, and without limitation, those tasks with a transferred heat energy above the median value are labeled "thermally hotter" and those tasks with a transferred heat energy below the median are labeled "thermally cooler." In some alternative embodiments, the terms "thermally hotter" and "thermally colder" are used with respect to a user-selected value for the amount of heat energy transferred by the processing tasks. In some other alternative embodiments, the terms "thermally hotter" and "thermally colder" are used with respect to a user-selected value for the predicted temperature increase expected to be induced by the processing tasks. In at least some alternative embodiments, any mechanism that clearly distinguishes the first group of thermally hotter processing tasks from the second group of thermally colder processing tasks is used.

In at least some embodiments, existing circumstances may be present that will prevent calculating predictions of the thermal properties of a particular task. For example, in at least some embodiments, and as described in more detail herein, determinations of the utilization and IPC for the first instances 240 of a process task are generated (see operations 312 and 310, respectively). Subsequently, in at least some embodiments, if the calculated average utilization time percentage for the core 104-X is less than T %, where T is a variable that is selected by the operator as follows.

In general, the variable T indicates a utilization threshold limit below which a processing task will not generate heat in the core. The value of T can vary from system to system as each system has different thermal limits. Hence the value of T is determined individually for each system. For example, a system with a highest rated temperature (at least partially based on the CPU manufacturer's "nameplate" ratings) has a thermal limit rating, i.e., "Rated," where allowing the temperature of the CPU to approach and reach the rated value will lead to thermal throttling. For a function "F," i.e., $F_{Rated}(X)$ is equivalent to the number of tasks with X % utilization operating below the "Rated" temperature value of the system. Further, in general, from experimentation it may be confirmed that such functions "F" follow a curve similar to the curve of 1/X, so that all the tasks with 0% utilization remain within the "Rated" temperature, whereas very few tasks with 100% utilization (where the value of $F_{Rated}(X)$ equals unity) will likely operate under the "Rated" temperature. Furthermore, based on the Pareto Principle (sometimes referred to as the "80/20 rule"), the value of T is defined at the utilization value where less than 20% of the total tasks are operating below the "Rated" temperature value. Accordingly, in at last some embodiments, while the value of T is selected by the operator, the value of T is often determined experimentally, and once selected, is static.

The IPC determinations discussed herein indicate the presence of phase changes, the scheduler module 220 does not permit predicting a thermal property of the phase changing second instances 244 of the processing tasks. Therefore, for such circumstances, a full thermal profile 130 will not be generated due to the determined low utilization value indicating a lower than expected use of the core resources during the execution phase, i.e., a less than expected level of heat generation in the respective core 104-X. Also, in conjunction with the utilization limit, a full thermal profile 130 will not be generated due to the determined IPC value (for example, a standard deviation value of the IPC being greater than 5%) indicating a degree of varying IPC values as the first instances 240 of the process task traverse through different phases of its resource use. Accordingly, if both underutilization of the processing resources and processing phase changes are indicated, a prediction of the thermal properties of a second instance 244 of the process task will not be generated and a full thermal profile 130 of the first instances 240 of the process task will not be generated in such embodiments.

In addition, for another example, in at least some embodiments, and as described in more detail herein, determinations of the utilization and back-end stalls for the first instances 240 of a process task are generated (see operations 312 and 308, respectively). Subsequently, in at least some embodiments, if the calculated average utilization time percentage for the core 104-X is greater than T %, and the back-end stall determinations discussed herein indicate the respective core 104-X is not saturated, the scheduler module 220 does not permit predicting a thermal property of the phase changing second instances 244 of the processing tasks. Therefore, for such circumstances, a full thermal profile 130 will not be generated due to the determined high utilization value indicating a greater than expected use of the core resources during the execution phase, i.e., a greater than expected level of heat generation in the respective core 104-X. Also, in conjunction with the utilization limit, a full thermal profile 130 will not be generated due to the determined back-end stall value (for example, an average value of the back-end stalls being less than 5%) indicating there are many stalls and the associated cores 104-X are not being efficiently used with respect to the use of the associated process cycles during the processing of the first instances 240 of the processing tasks. Accordingly, if both over-utilization of the processing resources and lack of core saturation are indicated, a prediction of the thermal properties of a second instance 244 of the process task will not be generated and a full thermal profile 130 of the first instances 240 of the process task will not be generated.

Figure 4:
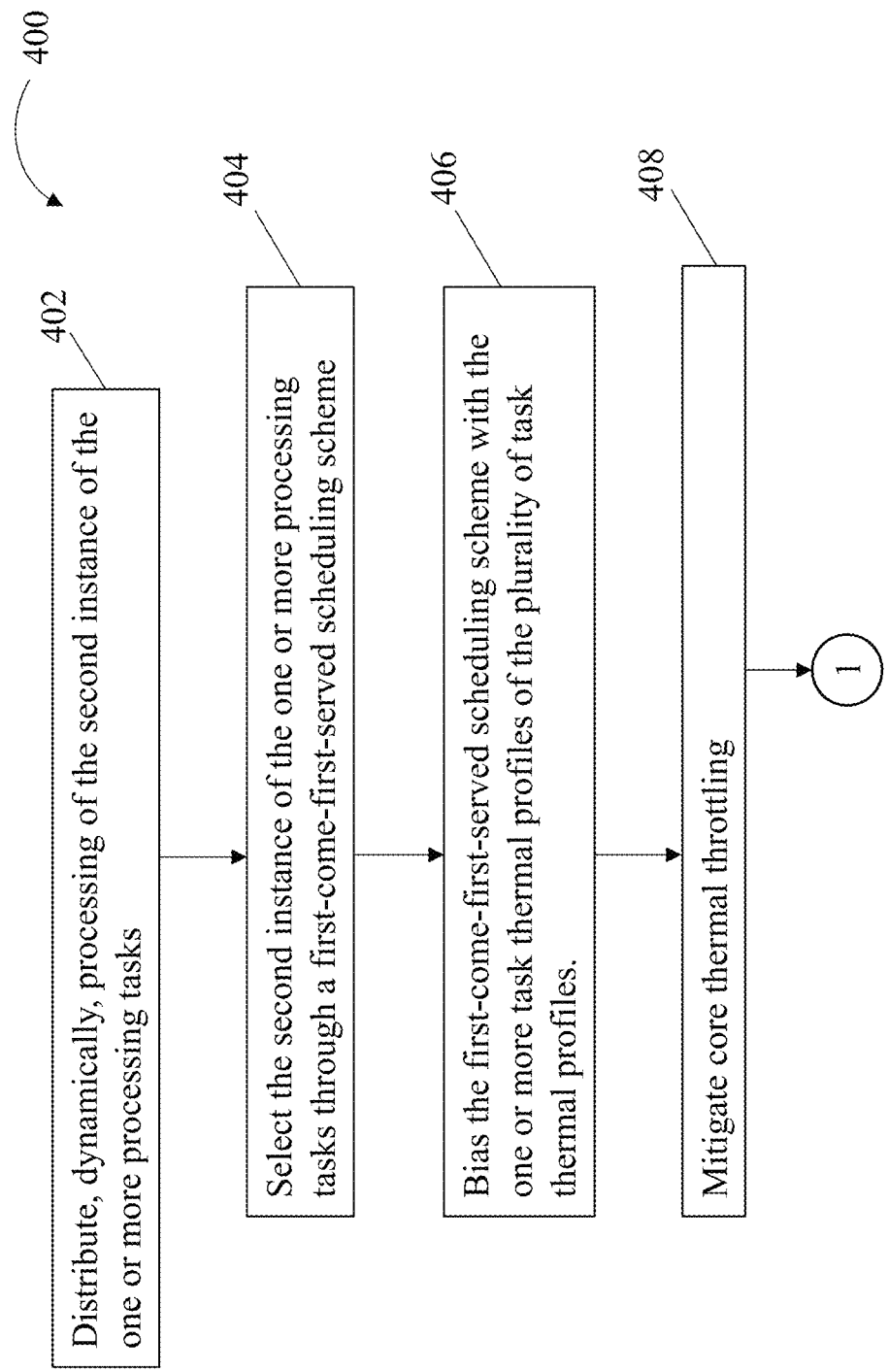
FIG. 4 is a flow chart illustrating a process for leveraging the thermal profiles of the processing tasks to mitigate a potential for thermal throttling, in accordance with some embodiments of the present disclosure.
Figure 4:
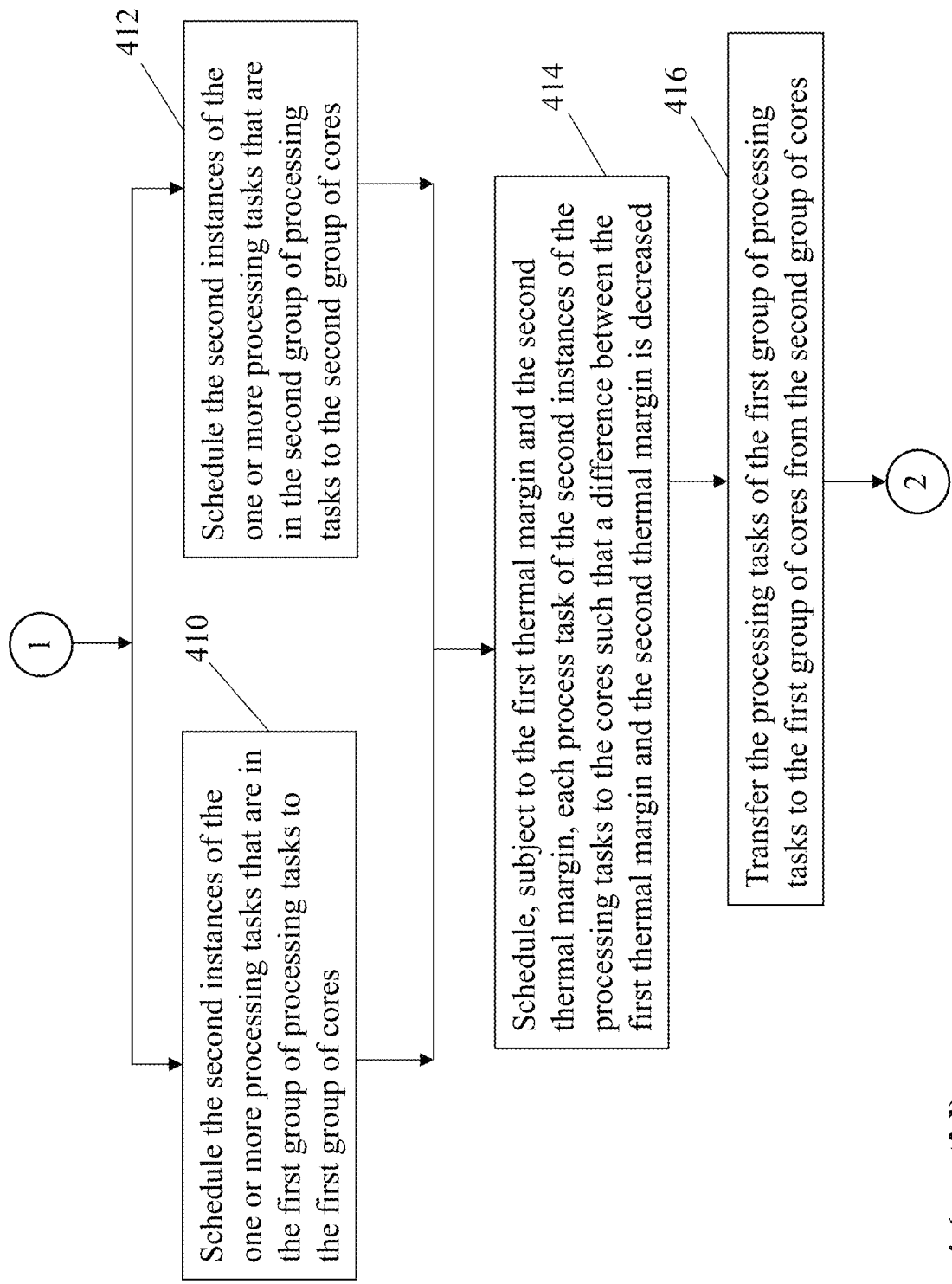
Figure 4:
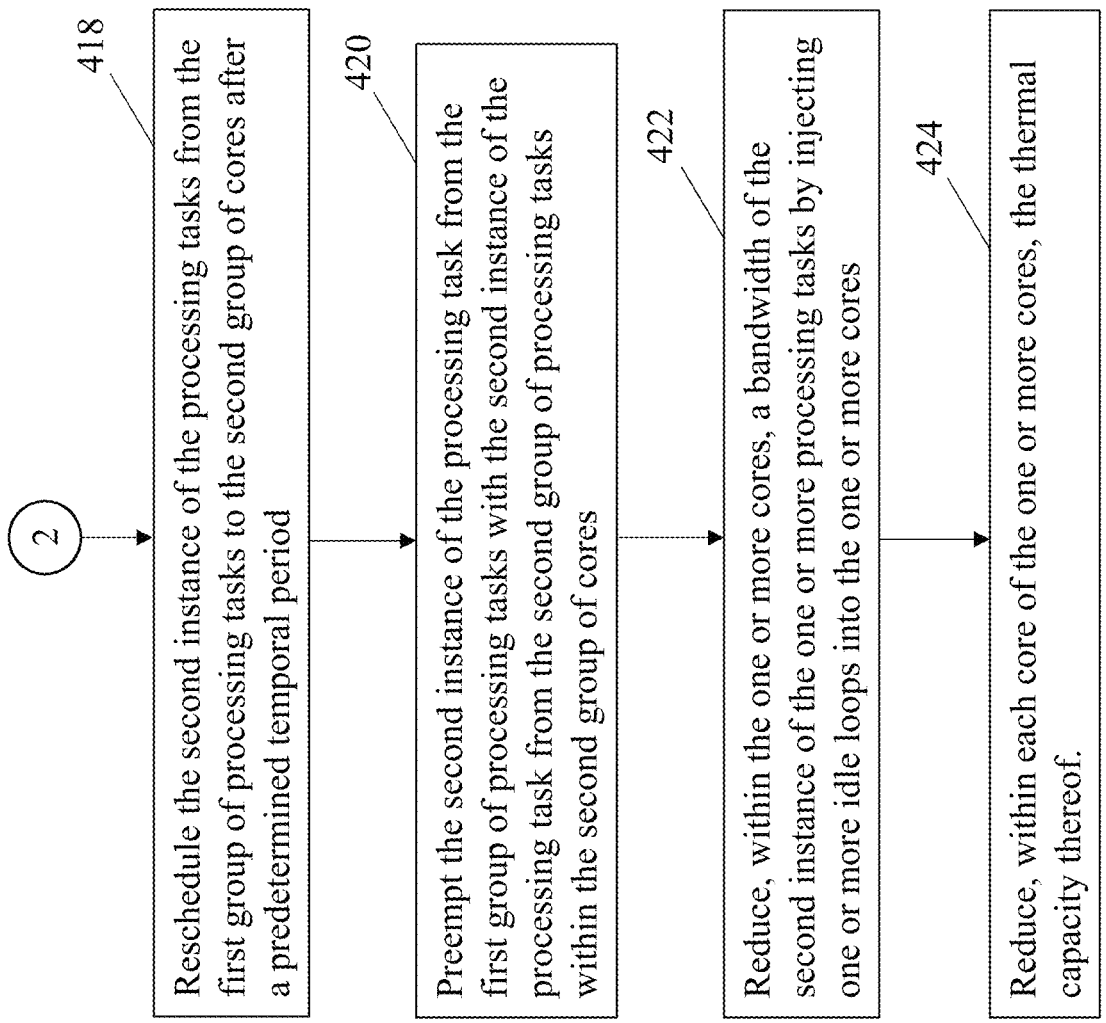

Referring to FIG. 4, and also referring to FIGS. 1-3, a flow chart is provided illustrating a process 400 for leveraging the thermal profiles 130 of the processing tasks 240 and 244 to mitigate a potential for thermal throttling. The process 400 includes distributing 402, dynamically, processing of the second instances 244 of the one or more processing tasks to the one or more cores 104-X of the one or more multi-core processing devices 202 subject to one or more of the plurality of predictions of thermal effects of the one or more processing tasks 244. In at least one embodiment, the second instance 244 of the processing tasks are scheduled 404, by the scheduler module 220, through a first-come-first-served scheduling scheme. In at least some embodiments, the first-come-first-served scheduling scheme is biased 406, by the scheduler module 220, with the one or more task thermal profiles 130 from the library 230 of the plurality of task thermal profiles 130.

In at least one embodiment, the scheduler module 220 has thermal information with respect to the historical processing of the first instances 240 of the processing tasks, a predicted thermal effect of the each of the second instances 244 of the processing tasks, and a real-time thermal status of each of the cores 104-X. For example, as discussed elsewhere herein, the second instances 244 of the processing tasks are grouped into a first group of processing tasks that are considered to be the hotter tasks and a second group of processing tasks are considered to be the colder tasks. Similarly, the real-time status of the cores 104-X are grouped into two groups, i.e., a first group of cores 104-X that are labeled as thermally cooler and a second group of cores 104-X that are labeled as thermally hotter. In some embodiments, the terms "thermally hotter" and "thermally cooler" are based on the measured real-time temperatures of the cores 104-X with respect to a predetermined margin to an established temperature limit for the cores 104-X. In some embodiments, the terms "thermally hotter" and "thermally cooler" are further based on the predicted thermal effects of the second instances 244 of the processing tasks on the cores 104-X in real-time given the existing processing load on the cores 104-X. In at least some alternative embodiments, any mechanism that clearly distinguishes the first group of thermally cooler cores 104-X from the second group of thermally hotter cores 104-X is used.

In at least some embodiments, the scheduler module 220 executes actions that mitigate 408 a potential for core thermal throttling. These actions include scheduling 410 the second instances 244 of the processing tasks that are in the first group (thermally hotter) of processing tasks to one or more cores 104-X of the first group (thermally cooler) of cores, where the first group of cores 104-X have a first thermal condition having a first thermal margin to the predetermined thermal threshold of the one or more 104-X. Also, in these embodiments, the scheduler module 220 schedules 412 the second instances 244 of the one or more processing tasks that are in the second group (thermally cooler) of processing tasks to one or more cores 104-X of the second group (thermally hotter) of cores 104-X having a second thermal condition which at least partially defines a second thermal margin to the predetermined thermal threshold of the one or more cores 104-X, where the second thermal margin is smaller than the first thermal margin. Accordingly, in at least one embodiment, the scheduler module 220 schedules 414, subject to the first thermal margin and the second thermal margin, each process task of the second instances 244 of the processing tasks to each core 104-X, thereby decreasing a difference between the first thermal margin and the second thermal margin, i.e., schedule the second instances 244 of the processing tasks such that thermal effects of the processing tasks 244 and the temperatures of the cores 104-X are managed by the scheduler module 220 to be flattened thermally.

In at least some embodiments, the scheduler module 220 executes specific actions to decrease the difference between the first thermal margin and the second thermal margin. For example, in at least some embodiments, the scheduler module 220 transfers 416 the second instance 244 of the processing tasks of the first group (thermally hotter) of processing tasks to one or more of the cores 104-X within the first group (cooler) of cores from the one or more second cores 104-X within the second group (thermally hotter) of cores 104-X. The scheduler module 220 determines which cores 104-X are busier as compared to the less busy cores 104-X, and the scheduler module 104-X will include the existing and planned workloads of the respective cores 104-X to determine which cores 104-X to transfer the processing tasks. The transfer operation 416 facilitates transfer of the processing tasks 244 that are more likely to heat the respective cores 104-X closer to the established thermal limits to those cores 104-X that have lower real-time temperatures.

In the event that the transfer operation 416 does not fully alleviate a potential for thermal throttling, another example of the scheduler module 220 executing specific actions to decrease the difference between the first thermal margin and the second thermal margin includes rescheduling 418 the second instance 244 of the processing tasks from the first group (thermally hotter) of processing tasks to the one or more cores 104-X within the second group (thermally hotter) of cores 104-X after a predetermined temporal period. The rescheduling operation 418 maintains the thermally hotter processing tasks 244 in abeyance for those circumstances where thermally cooler cores 104-X are not immediately available such that the thermally hotter cores 104-X have an opportunity to cool sufficiently to process the thermally hotter process task 244 without approaching the established thermal limit.

In the event that the reschedule operation 418 does not fully alleviate a potential for thermal throttling, another example of the scheduler module 220 executing specific actions to decrease the difference between the first thermal margin and the second thermal margin includes preempting the second instance 244 of the processing tasks from the first group (thermally hotter) of processing tasks with one or more second instances 244 of the processing tasks of the second group (thermally cooler) of processing tasks within the one or more cores 104-X within the second group (thermally hotter) of cores 104-X. The preempting operation 420 halts the processing of previously scheduled processing tasks that are labeled as thermally hotter and schedules thermally cooler processing tasks for a predetermined period of time and either completes execution of the preempted thermally hotter tasks in the originally schedule core 104-X of in an alternate core 104-X.

The transfer operation 416, the reschedule operation 418, and the preempt operation 420 may be considered and performed by the scheduler module 220 in any order that enables operation of the processing unit 202 and the computing system 200 as described herein to mitigate 408 a potential for core thermal throttling. In the event that the transfer operation 416, the reschedule operation 418, and the preempt operation 420 do not fully alleviate a potential for thermal throttling, another example of the scheduler module 220 executing specific actions to mitigate 408 a potential for core thermal throttling includes reducing 422, within the one or more cores 104-X, a bandwidth of the second instance 244 of the processing tasks by injecting one or more idle loops into selected cores 104-X. The bandwidth reduction operation 422 reduces the bandwidth of the processing tasks 244 known to increase the temperature of the cores 104-X to approach the thermal limits by thereby halting the execution of the processing tasks for a predetermined period of time and allowing the affected cores 104-X to cool down. In at least one embodiment, the predetermined bandwidth reduction is approximately 50%. Alternatively, in at least some embodiments, the value of the predetermined bandwidth reduction is any value that enables operation of the processing device 202 and the computing system 200 as described herein. If the bandwidth reduction operation 422 does not fully alleviate a potential for thermal throttling, and the scheduler module 220 reduces 424, within each core 104-X of the processing device 202, the available CPU processing capacity thereof. The CPU processing capacity reduction operation 424 is particularly effective if there exists a plurality of low utilization tasks in an execution queue (not shown). In general, if all of the processing tasks are determined to be the thermally cooler tasks, and the computing system still approaches or attains the thermal limits, then reducing the CPU processing capacity to X % will allow the CPU to be used for X % of the time only. For the rest of the time, the CPU will be allowed to cool down. In at least one embodiment, the predetermined CPU processing capacity reduction is approximately 50%. Alternatively, in at least some embodiments, the value of the predetermined CPU processing capacity reduction is any value that enables operation of the processing device 202 and the computing system 200 as described herein. Accordingly, the system, computer program product, and method as disclosed and described herein improve the performance of a computer system through defining a bounded performance impact for applications running in thermally constrained environments by estimating a thermal margin for the current workload mix at runtime.

Figure 5:
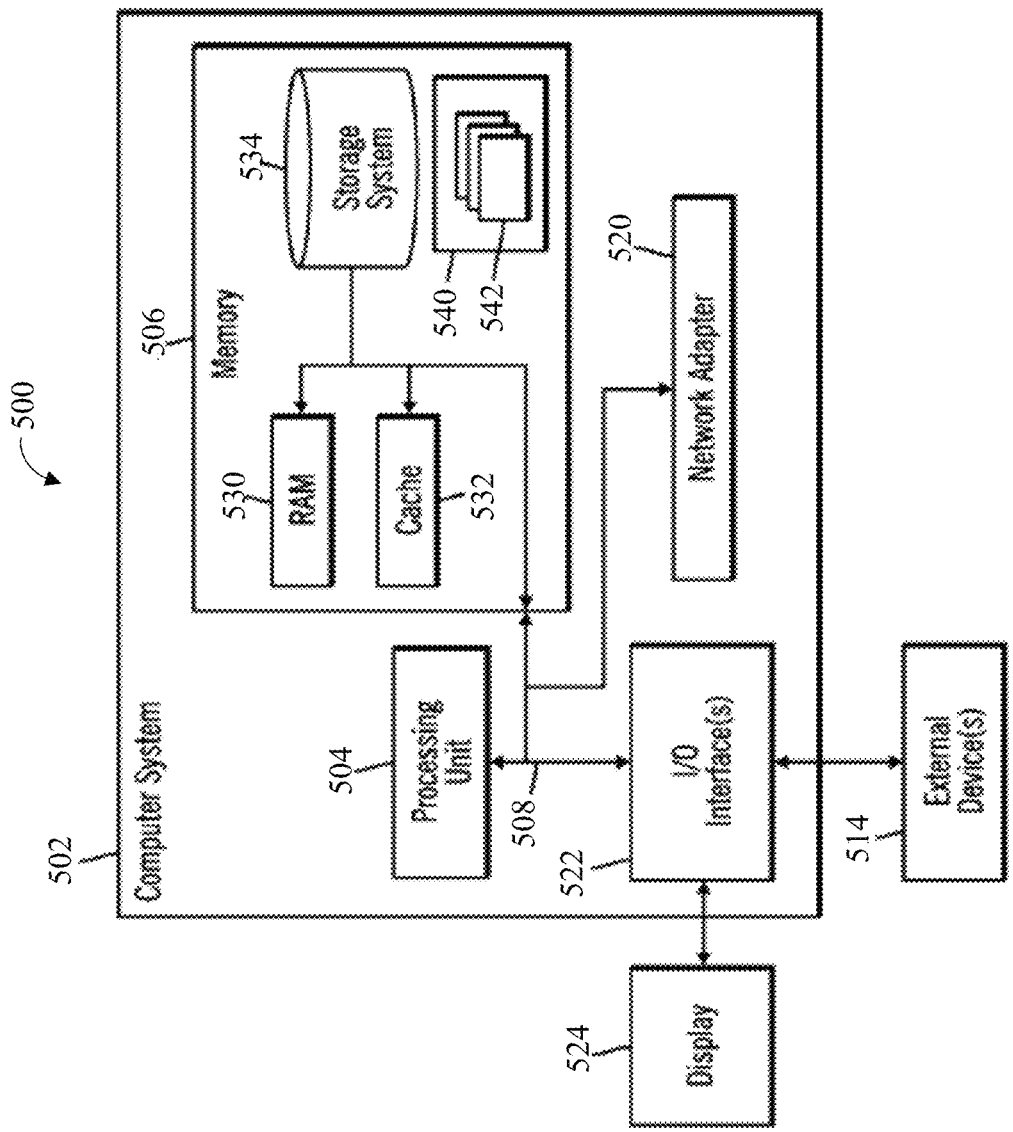
FIG. 5 is a block diagram illustrating a computer system/server of a cloud-based support system, to implement the processes described above with respect to FIGS. 1-4, in accordance with some embodiments of the present disclosure.

Aspects of the scheduler module 220 may be embodied in a computer system/server in a single location, or in at least one embodiment, may be configured in a cloud-based system sharing computing resources. With reference to FIG. 5, a block diagram is provided illustrating an example of a computer system 500 including a computer/server 502, hereinafter referred to as a host 502 in communication with a cloud based support system, to implement the system, tools, and processes described above with respect to FIGS. 1-4. Host 502 is operational with numerous other general purpose or special purpose computer system environments or configurations. Examples of well-known computer systems, environments, and/or configurations that may be suitable for use with host 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 502 may be described in the general context of computer system-executable instructions, such as program modules, being executed by a computer system. Generally, program modules may include routines, programs, objects, components, logic, data structures, and so on that perform particular tasks or implement particular abstract data types. Host 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, host 502 is shown in the form of a general-purpose computing device. The components of host 502 may include, but are not limited to, one or more processors or processing devices or units 504, e.g. hardware processors, a system memory 506, and a bus 508 that couples various system components including system memory 506 to processing device 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 502 typically includes a variety of computer system readable media. Such media may be any available media that is accessible by host 502 and it includes both volatile and non-volatile media, removable and non-removable media.

Memory 506 can include computer system readable media in the form of volatile memory, such as random access memory (RAM) 530 and/or cache memory 532. By way of example only, a storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces.

Program/utility 540, having a set (at least one) of program modules 542, may be stored in memory 506 by way of example, and not limitation, as well as an operating system, one or more application programs, other program modules, and program data. Each of the operating systems, one or more application programs, other program modules, and program data or some combination thereof, may include an implementation of a networking environment. Program modules 542 generally carry out the functions and/or methodologies of embodiments to leverage thermal profiles of processing tasks to dynamically schedule execution of the processing tasks. For example, the set of program modules 542 may include the scheduler module 220, including the plurality of modules embedded therein, as described in FIGS. 1-4.

Host 502 may also communicate with one or more external devices 514, such as a keyboard, a pointing device, etc.; a display 524; one or more devices that enable a user to interact with host 502; and/or any devices (e.g., network card, modem, etc.) that enable host 502 to communicate with one or more other computing devices. Such communication can occur via Input/Output (I/O) interface(s) 522. Still yet, host 502 can communicate with one or more networks such as a local area network (LAN), a general wide area network (WAN), and/or a public network (e.g., the Internet) via network adapter 520. As depicted, network adapter 520 communicates with the other components of host 502 via bus 508. In at least one embodiment, a plurality of nodes of a distributed file system (not shown) is in communication with the host 502 via the I/O interface 522 or via the network adapter 520. It should be understood that although not shown, other hardware and/or software components could be used in conjunction with host 902. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 506, including RAM 530, cache memory 532, and storage system 534, such as a removable storage drive and a hard disk installed in a hard disk drive.

Computer programs (also called computer control logic) are stored in memory 506. Computer programs may also be received via a communication interface, such as network adapter 520. Such computer programs, when run, enable the computer system to perform the features of the present embodiments as discussed herein. In particular, the computer programs, when run, enable the processing device 504 to perform the features of the computer system. As such, computer programs may represent controllers of the computer system. Accordingly, the functionality for the scheduler module 220, including the plurality of modules embedded therein, as described in FIGS. 1-4, is embodied as computer program code stored in memory 506 (in some embodiments as program modules 542), where the computer program code includes the instructions to be executed by the processing device 504 to provide the functionality of the for the scheduler module 220, including the plurality of modules embedded therein, as described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments. Accordingly, the functionality for the scheduler module 220, including the plurality of modules embedded therein, as described in FIGS. 1-4, may be embodied as computer readable program instructions to be executed by one or more hardware devices other than, or in addition to, the processing device 504 to provide the functionality for the scheduler module 220, including the plurality of modules embedded therein, as described herein.

In at least one embodiment, host 502 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
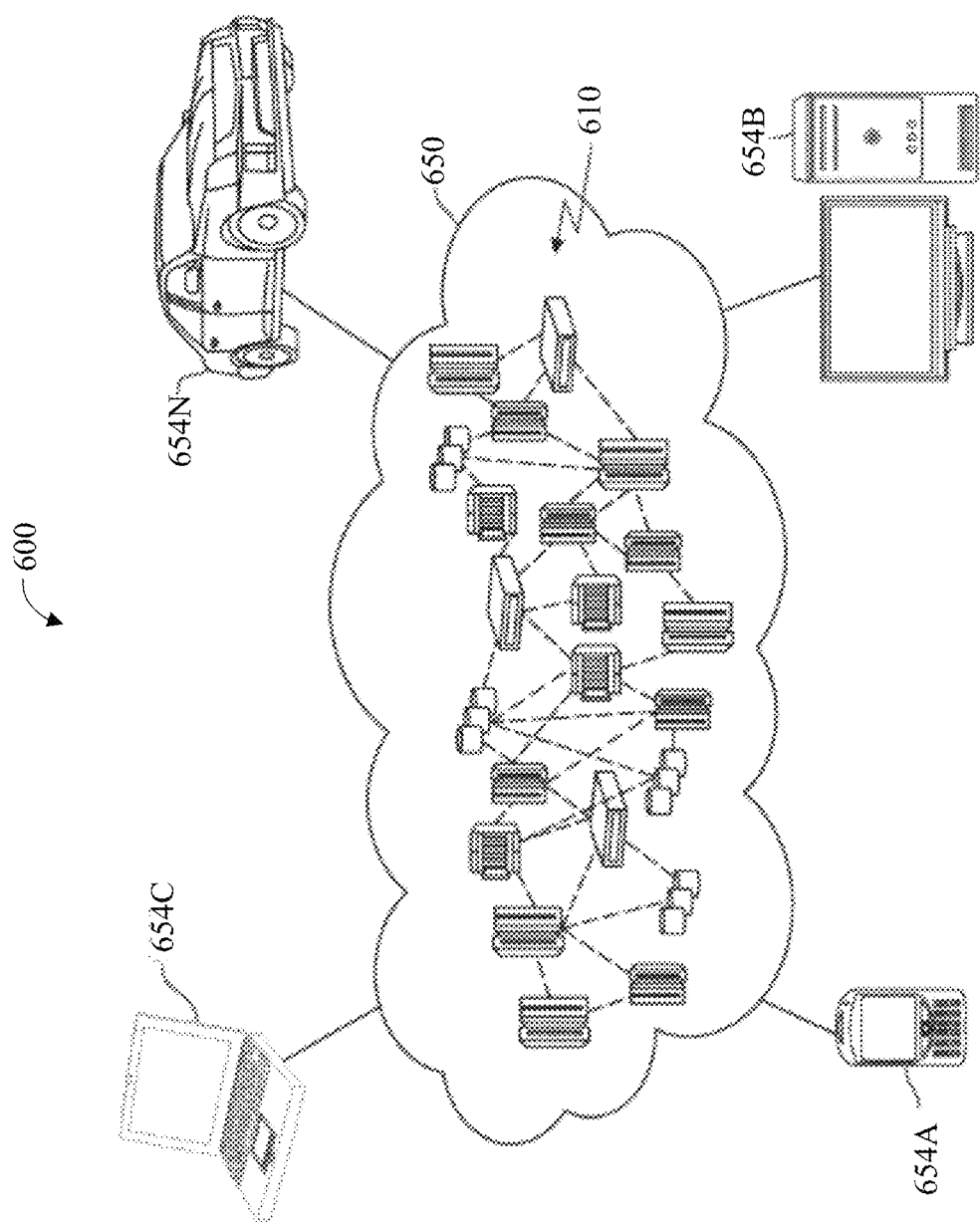
FIG. 6 is a schematic diagram illustrating a cloud computer environment, in accordance with some embodiments of the present disclosure.

Referring now to FIG. 6, a schematic diagram is provided illustrating an example cloud computing network 600. As shown, cloud computing network 600 includes a cloud computing environment 650 having one or more cloud computing nodes 610 with which local computing devices used by cloud consumers may communicate. Examples of these local computing devices include, but are not limited to, personal digital assistant (PDA) or cellular telephone 654A, desktop computer 654B, laptop computer 654C, and/or automobile computer system 654N. Individual nodes within nodes 610 may further communicate with one another. They may be grouped (not shown) physically or virtually, in one or more networks, such as Private, Community, Public, or Hybrid clouds as described hereinabove, or a combination thereof. This allows the cloud computing network 600 to offer infrastructure, platforms and/or software as services for which a cloud consumer does not need to maintain resources on a local computing device. It is understood that the types of computing devices 654A-N shown in FIG. 6 are intended to be illustrative only and that the cloud computing environment 650 can communicate with any type of computerized device over any type of network and/or network addressable connection (e.g., using a web browser).

Figure 7:
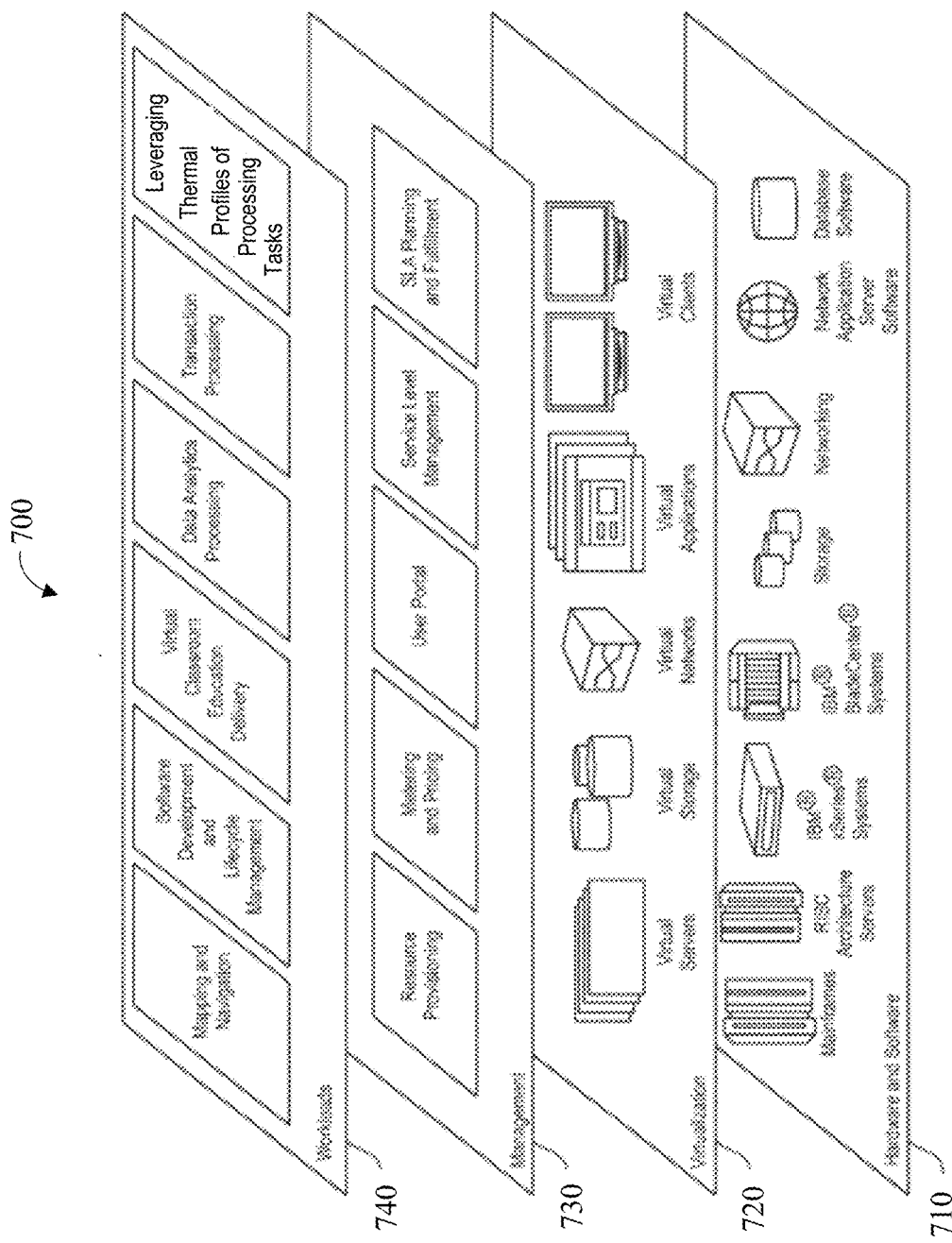
FIG. 7 is a block diagram illustrating a set of functional abstraction model layers provided by the cloud computing environment, in accordance with some embodiments of the present disclosure.

Referring now to FIG. 7, a set of functional abstraction layers 700 provided by the cloud computing network of FIG. 7 is shown. It should be understood in advance that the components, layers, and functions shown in FIG. 7 are intended to be illustrative only, and the embodiments are not limited thereto. As depicted, the following layers and corresponding functions are provided: hardware and software layer 710, virtualization layer 720, management layer 730, and workload layer 740.

The hardware and software layer 710 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 720 provides an abstraction layer from which the following examples of virtual entities may be provided: virtual servers; virtual storage; virtual networks, including virtual private networks; virtual applications and operating systems; and virtual clients.

In one example, management layer 730 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and leveraging thermal profiles of processing tasks, and, more specifically, for generating thermal profiles of the processing tasks including core hardware and core processing measurements and predictions of thermal performance based thereon, and scheduling the execution of the processing tasks in processing devices to mitigate a potential for reducing a margin to a hardware thermal limit.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present disclosure have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a computer-based system or platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
   one or more multi-core processing devices, each multi-core processing device of the one or more multi-core processing devices comprising two or more cores, the two or more cores configured to process one or more first instances of one or more processing tasks and one or more second instances of the one or more processing tasks;
   one or more memory devices operably coupled to the one or more multi-core processing devices;
   one or more hardware thermal counters coupled to each core of the two or more cores;
   one or more core processing performance counters coupled to each core of the two or more cores; and
   a scheduler module residing within the one or more memory devices, wherein the one or more multi-core processing devices are configured to implement the scheduler module, the scheduler module configured to:
      record one or more measurements of the two or more cores contemporaneously with the processing of the one or more first instances of the one or more processing tasks, wherein the one or more measurements include core thermal measurements and core processing performance measurements;
      generate, at least partially subject to the one or more measurements, one or more predictions of one or more thermal effects of processing the one or more second instances of the one or more processing tasks on the two or more cores;
      generate, subject to the one or more measurements and the one or more predictions of the one or more thermal effects, a thermal profile of each process task of the one or more first instances of the one or more processing tasks and the one or more second instances of the one or more processing tasks, thereby generating one or more task thermal profiles; and
      distribute, dynamically, subject to the one or more task thermal profiles, processing of the one or more second instances of the one or more processing tasks to the two or more cores.

2. The system of claim 1, further comprising the scheduler module configured to:
   determine, responsive to the generation of each task thermal profile of the one or more task thermal profiles, a core heating effect of each process task of the one or more first instances of the one or more processing tasks with respect to a predetermined thermal threshold of the two or more cores; and
   distinguish, responsive to the core heating effects determinations, the one or more first instances of the one or more processing tasks and their associated one or more task thermal profiles into a first group of processing tasks and a second group of processing tasks, wherein the first group of processing tasks includes a first subset of the one or more first instances of the one or more processing tasks and their associated one or more task thermal profiles that transfer a first amount of heat energy to the two or more cores, the second group of processing tasks includes a second subset of the one or more first instances of the one or more processing tasks and their associated one or more task thermal profiles that transfer a second amount of heat energy to the two or more cores, the first amount of heat energy greater than the second amount of heat energy.

3. The system of claim 2, further comprising the scheduler module configured to:
   schedule the one or more second instances of the one or more processing tasks that are in the first group of processing tasks to one or more first cores of the two or more cores, wherein the one or more first cores of the two or more cores define a first group of cores, the first group of cores having a first thermal condition having a first thermal margin to the predetermined thermal threshold of the two or more cores;
   schedule the one or more second instances of the one or more processing tasks that are in the second group of tasks to one or more second cores of the two or more cores, wherein the one or more second cores of the two or more cores define a second group of cores, the second group of cores having a second thermal condition having a second thermal margin to the predetermined thermal threshold of the two or more cores, wherein the second thermal margin is smaller than the first thermal margin;
   select the one or more second instances of the one or more processing tasks through a first-come-first-served scheduling scheme; and
   bias the first-come-first-served scheduling scheme with the one or more task thermal profiles.

4. The system of claim 3, further comprising the scheduler module configured to:
   mitigate core thermal throttling, the core thermal throttling comprising modulating a frequency of the two or more cores, comprising one or more of:
      schedule, subject to the first thermal margin and the second thermal margin, each process task of the one or more second instances of the one or more processing tasks to each core of the two or more cores, thereby decreasing a difference between the first thermal margin and the second thermal margin;
      reducing, within the two or more cores, a bandwidth of the one or more second instances of the one or more processing tasks by injecting one or more idle loops into the two or more cores; and
      reducing, within each core of the two or more cores, a processing capacity thereof.

5. The system of claim 4, further comprising the scheduler module configured to:

mitigate core thermal throttling, comprising one or more of:
- transfer the one or more second instances of the one or more processing tasks from the first group of processing tasks to the one or more first cores within the first group of cores from the one or more second cores within the second group of cores;
- schedule the one or more second instances of the one or more processing tasks from the first group of processing tasks to the one or more first cores within the first group of cores;
- reschedule the one or more second instances of the one or more processing tasks from the first group of processing tasks to the one or more second cores within the second group of cores after a predetermined temporal period; and
- preempt the one or more second instances of the one or more processing tasks from the first group of processing tasks with the one or more second instances of the one or more processing tasks from the second group of processing tasks within the one or more second cores within the second group of cores.

6. The system of claim 1, further comprising the scheduler module configured to:
- collect, through the one or more hardware thermal counters, one or more temperature measurements of each core of the two or more cores; and
- collect, through the one or more core processing performance counters, for each core of the two or more cores, one or more of:
  - one or more back-end stall measurements;
  - one or more instructions-per-cycle measurements; and
  - one or more utilization measurements.

7. A computer program product for leveraging thermal profiles of processing tasks, the computer program product comprising:
- one or more computer readable storage media; and
- program instructions collectively stored on the one or more computer-readable storage media, the program instructions comprising:
  - program instructions to process one or more first instances of one or more processing tasks and one or more second instances of the one or more processing tasks through two or more cores of one or more multi-core processing devices;
  - program instructions to record one or more measurements of the two or more cores contemporaneously with the processing of the one or more first instances of the one or more processing tasks, wherein the one or more measurements include core thermal measurements and core processing performance measurements;
  - program instructions to generate, at least partially subject to the one or more measurements, one or more predictions of one or more thermal effects of processing the one or more second instances of the one or more processing tasks on the two or more cores;
  - program instructions to generate, subject to the one or more measurements and the one or more predictions of the one or more thermal effects, a thermal profile of the one or more first instances of the one or more processing tasks and the one or more second instances of the one or more processing tasks, thereby generating one or more task thermal profiles; and
  - program instructions to distribute, dynamically, subject to the one or more task thermal profiles, processing of the one or more second instances of the one or more processing tasks to the two or more cores.

8. The computer program product of claim 7, the program instructions further comprising:
- program instructions to determine, responsive to the generation of the one or more task thermal profiles, a core heating effect of each process task of the one or more first instances of the one or more processing tasks with respect to a predetermined thermal threshold of the two or more cores; and
- program instructions to distinguish, responsive to the core heating effects determinations, the one or more first instances of the one or more processing tasks and their associated task thermal profiles into a first group of processing tasks and a second group of processing tasks, wherein the first group of processing tasks includes a first subset of the one or more first instances of the one or more processing tasks and their associated task thermal profiles that transfer a first amount of heat energy to the two or more cores, the second group of processing tasks includes a second subset of the one or more first instances of the one or more processing tasks and their associated task thermal profiles that transfer a second amount of heat energy to the two or more cores, the first amount of heat energy greater than the second amount of heat energy.

9. The computer program product of claim 8, the program instructions further comprising:
- program instructions to schedule the one or more second instances of the one or more processing tasks that are in the first group of processing tasks to one or more first cores of the two or more cores, wherein the one or more first cores of the two or more cores define a first group of cores, the first group of cores having a first thermal condition having a first thermal margin to the predetermined thermal threshold of the two or more cores; and
- program instructions to schedule the one or more second instances of the one or more processing tasks that are in the second group of tasks to one or more second cores of the two or more cores, wherein the one or more second cores of the two or more cores define a second group of cores, the second group of cores having a second thermal condition having a second thermal margin to the predetermined thermal threshold of the two or more cores, wherein the second thermal margin is smaller than the first thermal margin.

10. The computer program product of claim 9, the program instructions further comprising:
- program instructions to mitigate core thermal throttling, the core thermal throttling comprising modulating a frequency of the two or more cores, comprising one or more of:
  - program instructions to schedule, subject to the first thermal margin and the second thermal margin, each process task of the one or more second instances of the one or more processing tasks to each core of the two or more cores, thereby decreasing a difference between the first thermal margin and the second thermal margin, the program instructions further comprising:
    - program instructions to transfer the one or more second instances of the one or more processing tasks from the first group of processing tasks to the one or more first cores within the first group of cores from the one or more second cores within the second group of cores;

program instructions to schedule the one or more second instances of the one or more processing tasks from the first group of processing tasks to the one or more first cores within the first group of cores; and program instructions to reschedule the one or more second instances of the one or more processing tasks from the first group of processing tasks to the one or more second cores within the second group of cores after a predetermined temporal period;

program instructions to preempt the one or more second instances of the one or more processing tasks from the first group of processing tasks with the one or more second instances of the one or more processing tasks from the second group of processing tasks within the one or more second cores within the second group of cores;

program instructions to reduce, within the two or more cores, a bandwidth of the one or more second instances of the one or more processing tasks by injecting one or more idle loops into the two or more cores; and program instructions to reduce, within each core of the two or more cores, a processing capacity thereof.

11. The computer program product of claim 9, the program instructions further comprising:
program instructions to select the one or more second instances of the one or more processing tasks through a first-come-first-served scheduling scheme; and
program instructions to bias the first-come-first-served scheduling scheme with the one or more task thermal profiles.

12. The computer program product of claim 8, the program instructions further comprising:
program instructions collect one or more temperature measurements of each core of the two or more cores;
program instructions collect one or more back-end stall measurements within each core of the two or more cores;
program instructions collect one or more instructions-per-cycle measurements within each core of the two or more cores; and
program instructions collect one or more utilization measurements of the one or more second instances of the one or more processing tasks.

13. A computer-implemented method comprising:
processing one or more first instances of one or more processing tasks through two or more cores of one or more multi-core processing devices;
recording one or more measurements of the two or more cores contemporaneously with the processing of the one or more first instances of the one or more processing tasks, wherein the one or more measurements include core thermal measurements and core processing measurements;
generating, at least partially subject to the one or more measurements, one or more predictions of one or more thermal effects of processing the one or more second instances of the one or more processing tasks on the two or more cores;
generating, subject to the one or more measurements and the one or more predictions of the one or more thermal effects, a thermal profile of the one or more first instances of the one or more processing tasks, thereby generating one or more task thermal profiles; and distributing, dynamically, subject to the one or more task thermal profiles, processing of the one or more second instances of the one or more processing tasks to the two or more cores.

14. The method of claim 13, further comprising:
determining, responsive to the generation of the one or more task thermal profiles, a core heating effect of each process task of the one or more first instances of the one or more processing tasks with respect to a predetermined thermal threshold of the two or more cores; and
distinguishing, responsive to the core heating effects determinations, the one or more first instances of the one or more processing tasks and their associated task thermal profiles into a first group of processing tasks and a second group of processing tasks, wherein the first group of processing tasks includes a first subset of the one or more first instances of the one or more processing tasks and their associated task thermal profiles that transfer a first amount of heat energy to the two or more cores, the second group of processing tasks includes a second subset of the one or more first instances of the one or more processing tasks and their associated task thermal profiles that transfer a second amount of heat energy to the two or more cores, the first amount of heat energy greater than the second amount of heat energy.

15. The method of 14, further comprising:
defining a bounded performance impact for applications including the one or more processing tasks running in a thermally constrained environment, comprising estimating a thermal margin for a current workload mix at runtime.

16. The method of claim 15, further comprising:
scheduling the one or more second instances of the one or more processing tasks that are in the first group of processing tasks to one or more first cores of the two or more cores, wherein the one or more first cores of the two or more cores define a first group of cores, the first group of cores having a first thermal condition having a first thermal margin to the predetermined thermal threshold of the two or more cores; and
scheduling the one or more second instances of the one or more processing tasks that are in the second group of tasks to one or more second cores of the two or more cores, wherein the one or more second cores of the two or more cores define a second group of cores, the second group of cores having a second thermal condition having a second thermal margin to the predetermined thermal threshold of the two or more cores, wherein the second thermal margin is smaller than the first thermal margin.

17. The method of claim 16, further comprising:
mitigating core thermal throttling, the core thermal throttling comprising modulating a frequency of the two or more cores, comprising one or more of:
scheduling, subject to the first thermal margin and the second thermal margin, each process task of the one or more second instances of the one or more processing tasks to each core of the two or more cores, thereby decreasing a difference between the first thermal margin and the second thermal margin;
reducing, within the two or more cores, a bandwidth of the one or more second instances of the one or more processing tasks by injecting one or more idle loops into the two or more cores; and
reducing, within each core of the two or more cores, a processing capacity thereof.

18. The method of claim 17, wherein scheduling each process task comprises:
- transferring the one or more second instances of the one or more processing tasks from the first group of processing tasks to the one or more first cores within the first group of cores from the one or more second cores within the second group of cores;
- scheduling the one or more second instances of the one or more processing tasks from the first group of processing tasks to the one or more first cores within the first group of cores;
- rescheduling the one or more second instances of the one or more processing tasks from the first group of processing tasks to the one or more second cores within the second group of cores after a predetermined temporal period; and
- preempting the one or more second instances of the one or more processing tasks from the first group of processing tasks with the one or more second instances of the one or more processing tasks from the second group of processing tasks within the one or more second cores within the second group of cores.

19. The method of claim 16, wherein scheduling each process task comprises:
- selecting the one or more second instances of the one or more processing tasks through a first-come-first-served scheduling scheme; and
- biasing the first-come-first-served scheduling scheme with the one or more task thermal profiles.

20. The method of claim 13, wherein generating the thermal profile including thermal measurements and core processing performance measurements comprises:
- collecting one or more temperature measurements of each core of the two or more cores;
- collecting one or more back-end stall measurements within each core of the two or more cores;
- collecting one or more instructions-per-cycle measurements within each core of the two or more cores; and
- collecting one or more utilization measurements within each core of the two or more cores.

* * * * *